(12) United States Patent
King et al.

(10) Patent No.: US 7,818,387 B1
(45) Date of Patent: Oct. 19, 2010

(54) SWITCH

(75) Inventors: James E. King, Wokingham (GB); Karen Roles, Send (GB)

(73) Assignee: Oracle America, Inc., Redwood City, CA (US)

( * ) Notice: Subject to any disclaimer, the term of this patent is extended or adjusted under 35 U.S.C. 154(b) by 1966 days.

(21) Appl. No.: 10/774,755

(22) Filed: Feb. 9, 2004

(51) Int. Cl.
*G06F 15/16* (2006.01)

(52) U.S. Cl. ......................................... 709/208; 714/10

(58) Field of Classification Search ................. 709/208; 714/10
See application file for complete search history.

(56) References Cited

U.S. PATENT DOCUMENTS

| | | | |
|---|---|---|---|
| 5,276,683 A * | 1/1994 | Ohkubo | 370/475 |
| 5,522,042 A * | 5/1996 | Fee et al. | 709/226 |
| 5,577,032 A | 11/1996 | Sone et al. | |
| 5,655,120 A | 8/1997 | Witte et al. | |
| 5,815,652 A * | 9/1998 | Ote et al. | 714/31 |
| 5,892,898 A * | 4/1999 | Fujii et al. | 714/57 |
| 5,940,491 A * | 8/1999 | Anderson et al. | 379/230 |
| 6,199,180 B1 * | 3/2001 | Ote et al. | 714/31 |
| 6,247,078 B1 | 6/2001 | Ebert et al. | |
| 6,289,414 B1 * | 9/2001 | Feldmeier et al. | 711/108 |
| 6,452,809 B1 | 9/2002 | Jackson et al. | |
| 6,505,254 B1 | 1/2003 | Johnson et al. | |
| 6,556,438 B1 | 4/2003 | Bolognia et al. | |
| 6,560,606 B1 | 5/2003 | Young | |
| 6,580,616 B2 * | 6/2003 | Greenside et al. | 361/752 |
| 6,583,989 B1 | 6/2003 | Guyer et al. | |
| 6,594,150 B2 | 7/2003 | Creason et al. | |
| 6,654,252 B2 | 11/2003 | Raynham | |
| 6,721,794 B2 | 4/2004 | Taylor et al. | |
| 6,742,068 B2 | 5/2004 | Gallagher et al. | |
| 6,745,286 B2 | 6/2004 | Staub et al. | |
| 6,747,878 B1 * | 6/2004 | Hipp et al. | 361/801 |
| 6,754,826 B1 * | 6/2004 | Challener et al. | 713/182 |
| 6,782,531 B2 | 8/2004 | Young | |
| 6,865,591 B1 * | 3/2005 | Garg et al. | 709/201 |
| 6,891,214 B2 * | 5/2005 | Mori et al. | 257/298 |
| 6,950,895 B2 * | 9/2005 | Bottom | 710/301 |
| 7,028,218 B2 * | 4/2006 | Schwarm et al. | 714/11 |
| 7,197,558 B1 * | 3/2007 | Harper et al. | 709/224 |
| 7,305,670 B2 * | 12/2007 | Ogasawara et al. | 717/171 |

(Continued)

OTHER PUBLICATIONS

U.S. Appl. No. 10/774,756, entitled "Naming", by King, et al., filed Feb. 9, 2004.

(Continued)

*Primary Examiner*—Thu Nguyen
*Assistant Examiner*—Tauqir Hussain
(74) *Attorney, Agent, or Firm*—Meyertons, Hood, Kivlin, Kowert & Goetzel, P.C.

(57) ABSTRACT

A combined switch and service processor module for a modular computer system is provided. The combined switch and service processor module comprises a switch portion; a service processor portion; and a data interface for communicating management information to other parts of the modular computer system. Wherein the service processor portion is operable to operate in master/slave relationship with a service processor portion of a further combined switch and service processor module of the modular computer system; and wherein the service processor portion is further operable automatically to synchronise management information with the service processor portion of the further combined switch and service processor via the data interface in accordance with the master/slave relationship.

27 Claims, 12 Drawing Sheets

U.S. PATENT DOCUMENTS

| | | | |
|---|---|---|---|
| 7,415,509 B1* | 8/2008 | Kaltenmark et al. | 709/219 |
| 7,467,198 B2* | 12/2008 | Goodman et al. | 709/223 |
| 7,489,924 B2* | 2/2009 | Choi | 455/420 |
| 7,502,823 B2* | 3/2009 | Garg et al. | 709/203 |
| 2001/0052006 A1* | 12/2001 | Barker et al. | 709/223 |
| 2002/0004912 A1* | 1/2002 | Fung | 713/300 |
| 2002/0107990 A1 | 8/2002 | Johnson et al. | |
| 2002/0120741 A1 | 8/2002 | Webb et al. | |
| 2002/0124114 A1 | 9/2002 | Bottom et al. | |
| 2003/0033360 A1 | 2/2003 | Garnett et al. | |
| 2003/0033362 A1 | 2/2003 | King et al. | |
| 2003/0033365 A1 | 2/2003 | Garnett et al. | |
| 2003/0105859 A1 | 6/2003 | Garnett et al. | |
| 2003/0105903 A1 | 6/2003 | Garnett et al. | |
| 2003/0142628 A1* | 7/2003 | Alonso et al. | 370/241 |
| 2003/0193944 A1* | 10/2003 | Sasagawa | 370/389 |
| 2004/0122923 A1* | 6/2004 | Kamenetsky et al. | 709/223 |
| 2004/0153749 A1* | 8/2004 | Schwarm et al. | 714/11 |
| 2004/0225659 A1* | 11/2004 | O'Brien et al. | 707/9 |
| 2004/0264398 A1* | 12/2004 | Chu et al. | 370/312 |
| 2005/0028039 A1* | 2/2005 | Henderson et al. | 714/42 |
| 2005/0047098 A1 | 3/2005 | Garnett et al. | |
| 2005/0063354 A1 | 3/2005 | Garnett et al. | |
| 2005/0071625 A1* | 3/2005 | Schwartz et al. | 713/100 |
| 2005/0114464 A1* | 5/2005 | Amir et al. | 709/213 |
| 2005/0193229 A1* | 9/2005 | Garg et al. | 714/4 |
| 2005/0283445 A1* | 12/2005 | Trinon et al. | 705/75 |
| 2006/0029203 A1* | 2/2006 | Bhusri | 379/220.01 |
| 2006/0036899 A1* | 2/2006 | Nemoto et al. | 714/5 |

OTHER PUBLICATIONS

U.S. Appl. No. 10/839,596, entitled "Common Storage in Scalable Computer Systems", by King, et al., filed May 5, 2004.

* cited by examiner

SWITCH

BACKGROUND OF THE INVENTION

The present invention relates to a switch, in particular but not exclusively to a system of integrated switch modules for a multi-processing domain computer system.

One application for the present invention relates to high density computer systems, for example, computer server systems for telecommunications applications. In telecommunications applications, it is important to provide high reliability and high capacity of operation. Various approaches have been taken to providing such high-performance, high reliability systems. Typically such systems are designed around providing redundant resources so that if one component of the system develops a fault, the system remains operational using the redundant resources. Fault tolerance can also be achieved, for example, with multiprocessor systems that provide redundancy through dynamic, e.g., software-controlled, task distribution. High density systems are typically rack mountable, with one or more processor systems occupying a shelf in the rack. The trend in recent times is to make the computers with smaller form factors. This means that more computers can be located in a rack. This has the advantage of increasing the processing density within the racks, and also the advantage of reducing the distance between the computer systems.

The present invention relates to providing increased reliability and fault tolerance for a switch and service processor in a high density computer system.

SUMMARY OF THE INVENTION

A first aspect provides a combined switch and service processor module for a modular computer system. The combined switch and service processor module comprises a switch portion; a service processor portion; and a data interface for communicating management information to other parts of the modular computer system. Wherein the service processor portion is operable to operate in master/slave relationship with a service processor portion of a further combined switch and service processor module of the modular computer system; and wherein the service processor portion is further operable automatically to synchronise management information with the service processor portion of the further combined switch and service processor via the data interface in accordance with the master/slave relationship.

This arrangement allows integrated service processors which operate independent of the switch, with independent communication paths, but have intimate knowledge of the switch status to keep switch configuration in sync in the absence of a master-slave relationship between switches and peer-peer configuration capabilities.

A second aspect provides a combined switch and service processor module for a modular computer system. The combined switch and service processor module comprises a switch portion; a service processor portion; and a data interface for communicating with an external management entity. Wherein the switch and service processor portions are each operable to communicate with the external management entity to obtain a unique address within a computing environment into which the modular computer system is connected This arrangement enables associated entities such as the switch and service processor to share a common unique identifier, which unique identifier is portable to a replacement system.

A further aspect provides a combined switch and service processor module for a modular computer system. The combined switch and service processor module comprises a switch portion; a service processor portion having a user interface; and a physical data interface for communicating with an external management entity. The service processor portion user interface is operable to receive and forward communications between the external management entity and the switch portion.

This arrangement allows any access to the switch configuration to be passed through appropriate system configuration permission controls without inconsistencies, even in a standalone environment. In addition, the switch software can be simplified as it does not need to provide authentication or security features such as encryption. Also, user configuration can be simplified in that it can be applied as a system configuration which affects both the network configuration and domain configuration for a given combined switch and service processor module and the service processor can take such configuration information and translate it into the appropriate switch configuration, such that no switch configuration which is not relevant to that system is exported to users. Additionally, hardware costs and space consumption are reduced by the omission of components for an external switch interface.

Another aspect provides a combined switch and service processor module for a modular computer system. The combined switch and service processor module comprises a switch including a switch processor; a service processor including a service processor; and a data interface for communicating with an external management entity. The switch and service processor are each operable to create a unique identifier using data unique to the respective processor; and the service processor is operable to supply its unique identifier to the switch for use by the switch in identifying itself in precedence to the switch's own unique identifier.

By making the service processor the master of the inventory and manufacturing data in this fashion, the arrangement provides a common inventory data identity for the entire combined switch and service processor, which common identity is available from both switch and service processor. For those processes which require the switch's own manufacturing and hardware tracking data, this information is also available.

A further aspect provides a combined switch and service processor module for a modular computer system. The combined switch and service processor module comprises a switch portion; a service processor portion; a data interface for communicating with an external management entity; and a fault management unit. The fault management unit is operable to intercept any fault messages generated by the switch portion and the service processor portion and to perform rationalisation processing on those messages to determine whether to forward a given message to the external management entity.

This arrangement provides a system where intuitive and useful fault reporting is available for systems administrators. Thus the likelihood of a correct fault diagnosis being made is increased, leading to more effective, cost efficient and time efficient servicing. By this arrangement unnecessary service actions relating to correctly functioning components can be reduced.

BRIEF DESCRIPTION OF THE FIGURES

Embodiments of the present invention will be described hereinafter, by way of example only, with reference to the accompanying drawings in which like reference signs relate to like elements and in which.

Figure 1:
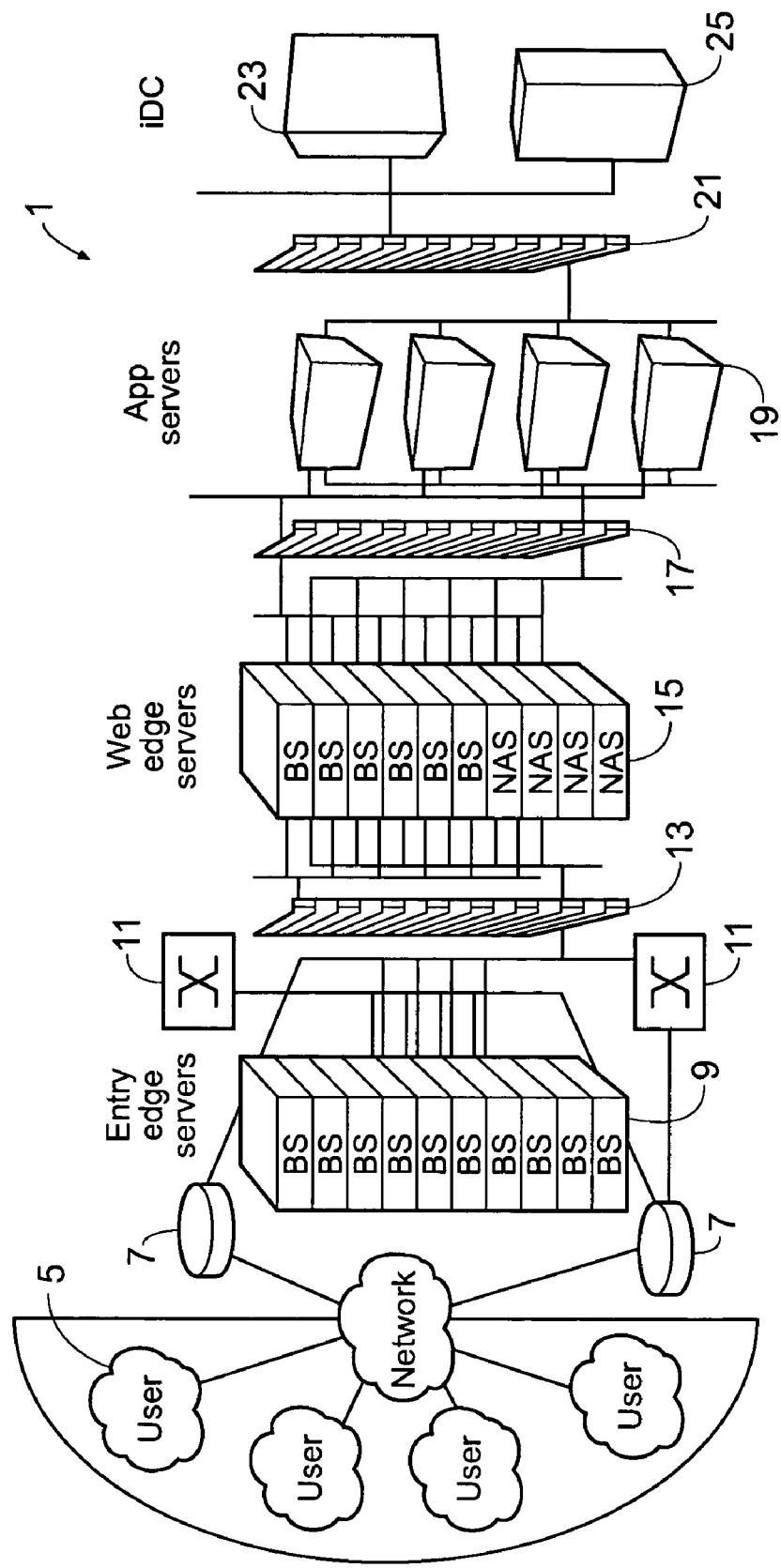
FIG. 1 is a schematic representation of an architecture of a multiprocessor system for supporting a web site.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments and examples are described hereafter by way of example only in the following with reference to the accompanying drawings.

Shown in FIG. 1 is an example of an application of a high capacity multiserver system 1 for implementing a network-connected web site such as, for example, an airline reservation system on the World Wide Web.

As shown in FIG. 1, an external network 3 (e.g., the Internet) for communicating with a user 5 can be connected to gateways 7 which can be connected to an entry edge server group 9 implemented by a web farm. The entry edge server group 9 forms an interface to the external network 3. The entry edge server group 9 can then be connected by switches 11 and a firewall 13 to a web edge server group 15 that can also be implemented as a web farm as shown in FIG. 1. The web edge server group 15 can serve to cache web pages that are readily accessible to users 5 accessing the system 1 from the external network 3, for example for checking flight times, etc. The web edge server group can comprise a number of blade server (BS) shelves and a number of network addressable storage (NAS) shelves for storing critical data. Communications between the blade server shelves may be controlled using a master switch shelf (MS). The web edge server group 15 can be further connected by a further firewall 17 to a plurality of application servers 19, which can be responsible for, for example, processing flight reservations. The application servers 19 can then be connected via a further firewall 21 to computer systems 23, 25, for example, e-commerce services including financial services for receiving and processing payment for airline reservations.

As will be appreciated, the server system described above with reference to FIG. 1 is only an example of a possible application for a multiprocessor server system. Multiprocessor server systems have many different applications and the present system is not limited to being applicable for use in only one or a limited number of such applications, rather multiprocessor server systems as described herein are operable for use in many different applications. A non-exhaustive list of such alternative applications includes: e-commerce web server systems; telecommunications network server systems; LAN application and file server systems and remote vehicle control systems.

Figure 2:
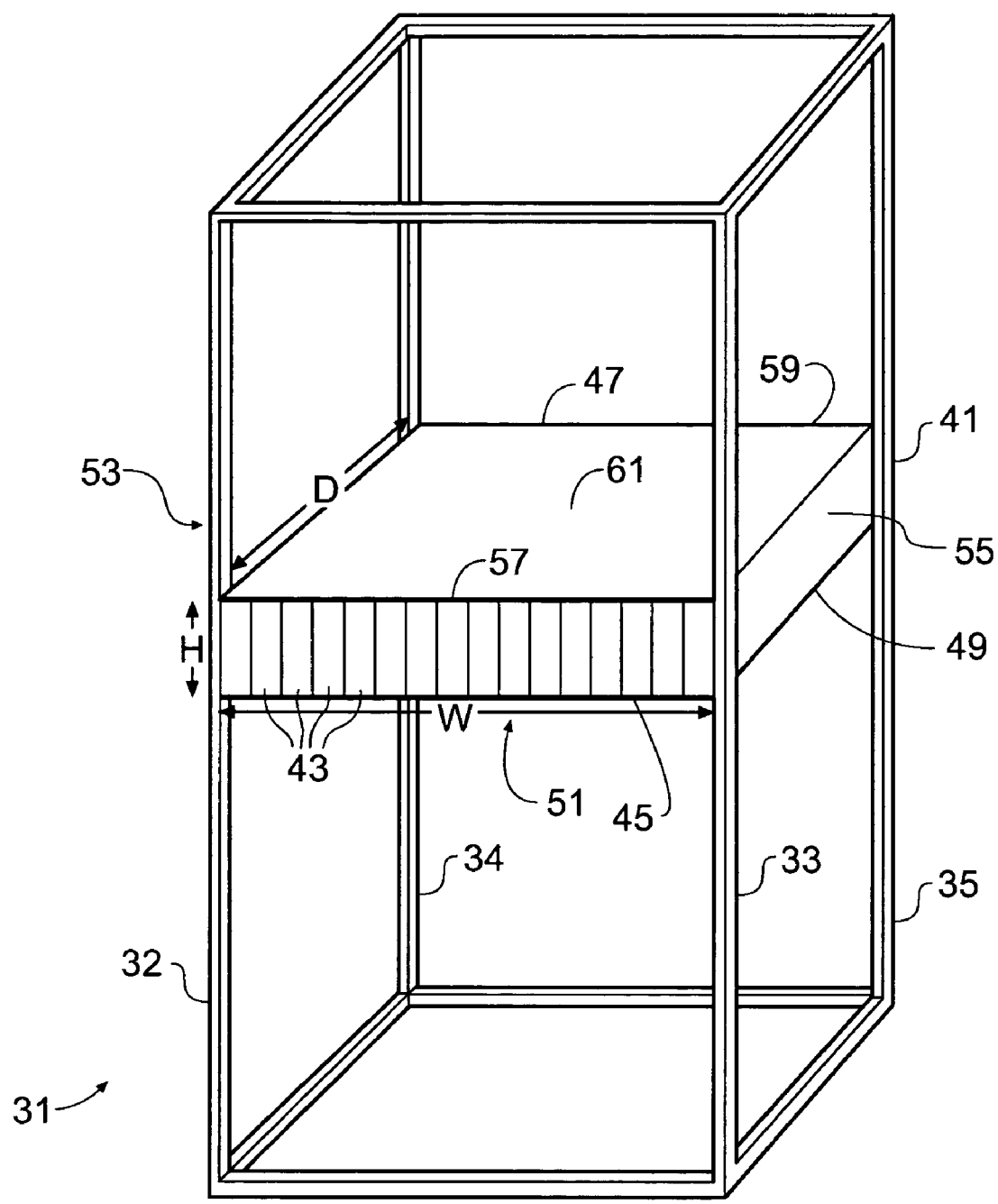
FIG. 2 is a schematic representation of a racking system incorporating an example of a carrier in the form of a rack-mountable shelf according to a first example.

With reference to FIG. 2, there is shown a schematic perspective representation of a rack system 31 as viewed from the front including left and right front uprights 32 and 33 and left and right rear uprights 34 and 35. The uprights can be formed with apertures for receiving shelf fixings (e.g., screws, bolts, clips, etc., for mounting brackets, slides, rails, etc.).

Also shown in FIG. 2 is an example of a blade server shelf 41 mounted in the rack system 31. The shelf 41 forms a carrier configured to carry a plurality of information processing cartridges 43 located side by side along the shelf.

The term "shelf" is used herein in a conventional way to describe a structure that is mountable in rack system 31 and is configured to carry one or more components to form at least a part of a rack-mountable system. In the present example, the shelf 41 is three-dimensional, having a height (H), width (W) and depth (D). In the present example, one dimension (hereinafter described as the height, H) is smaller than the other dimensions (hereinafter described as the depth, D, and the width, W) to facilitate mounting of the shelf within the rack system 31. It will be appreciated that although the width and depth are typically constrained by the dimensions of the racking system for which the shelf is designed, there is more freedom as regard the height, subject to taking account of any appropriate standards and packaging considerations.

Each of the information processing cartridges contains at least one processor. Each information processing cartridge in the present example is operable as a server. In the described examples, the information processing cartridges are configured as robust enclosed modules.

In the example to be described in more detail presently, the information processing cartridges, when aligned in the carrier shelf, look like rectangular slabs, or blades. Accordingly, an information processing cartridge can be described as a blade. The information processing cartridges 43 comprise information processing modules enclosed in an enclosure, or housing, so that the information processing modules have the form of cartridges. Also, as the information processing cartridges are to operate as computer servers in the example described in more detail presently, an information processing cartridge 43 can also be described as a server blade. Accordingly, in the context of this example, the terms module, cartridge and blade are used interchangeably.

The illustrated example of a shelf 41 is configured to carry sixteen information processing cartridges 43, each of which is removably mountable in a respective opening 45 in the front of the shelf, whereby the information processing cartridges can be inserted into and removed from the front of the shelf 41 without removing the shelf 41 from the rack system 31.

In the present example, the shelf 41 comprises a three-dimensional, generally rectangular, enclosure, or housing, 47 that is suitable for mounting in generic racking systems including both 4-post and 2-post systems. It can be mounted on fixed rigid rack mounting ears and/or a simple slide/support system.

This example of a shelf 41 has a single enclosure, or housing, 47 that houses a number of modular units or subsystems, the majority of which are replaceable in the field and are therefore known as Field Replaceable Units (FRUs). These modular units include the information processing cartridges 43.

The shelf enclosure 47 can be fabricated from sheet material (e.g., from steel sheet) to form a chassis portion 49 that includes a base 51, two sides 53 and 55, a front 57 and a rear 59. The word "front" as used here is merely used as a label herein to refer to the face, or wall 57 of the enclosure that is located at the main access side of the rack system 31 in use when the shelf is mounted therein. Similarly, the words "rear" and "side" are merely used as labels herein to refer to the faces, or walls 59, 53 and 55 that, in use, are located at those respective positions when the shelf is mounted in the rack system 31.

The openings 45 can be formed in the front face 57 for receiving the information processing cartridges 43 and, as will be explained later, apertures can also be formed in the rear face 59 for receiving further FRUs. The enclosure can further include a removable top cover 61 that can be secured to the chassis portion 49 by suitable fastening (e.g., screws). The apertures in the front and rear faces 57 and 59 allow at least some of the FRUs to be inserted into and/or removed from the shelf enclosure 47 via the front or the rear thereof, as appropriate, without removing the shelf from the racking. Access to components mounted in the shelf that are not accessible via one of the apertures in the front 47 and rear 59 faces can be achieved by removing the shelf enclosure 47 from the racking system 31 and then removing the top cover 61 of the shelf enclosure 47.

In the present example, the shelf 41 is configured to receive a plurality of information processing cartridges 43 at the front face of the housing 47. The shelf 41 of the present example is further configured to receive a pair of power supply field replaceable units (PSUs) (not shown) and a pair of combined switch and service processor field replaceable units (CSSPs) 71 at the rear face of the housing 47. The CSSPs 71 of the example provide both switching and management (service processor) facilities for the information processing cartridges 43 received in the shelf 41. The PSUs provide power to the shelf 41 and modules received therein. In the present example redundancy of support modules is provided, that is to say each PSU is independently capable of providing power to each of the maximum number of information processing cartridges 41 receivable within the housing 47 and to each of the CSSPs 71. In addition, each CSSP 71 is independently operable to provide data switching and management services for each of the maximum number of information processing cartridges 41 receivable within the housing 47 and management services to each of the PSUs.

Examples and description of a computer system shelf 41 and various field replaceable modules for use therewith are to be found in published U.S. patent application Ser. No. 10/171, 809 filed 14 Jun. 2002, publication serial number US2003/0030988 (corresponding International Patent Application publication number WO 03/014893). Examples and description of a field replaceable unit for providing data switching services for blades received within a computer system shelf 41 are to be found in published U.S. patent application Ser. No. 10/171,794 filed 14 Jun. 2002, publication serial number US2003/0033360. The whole content of each of those documents is hereby incorporated herein by reference, in its entirety.

The internal configuration of the shelf 41 and a midplane 171 contained therein is described in the following with reference to FIGS. 3A, 3B and 3C, and FIGS. 4A, 4B and 4C.

Figure 3A:
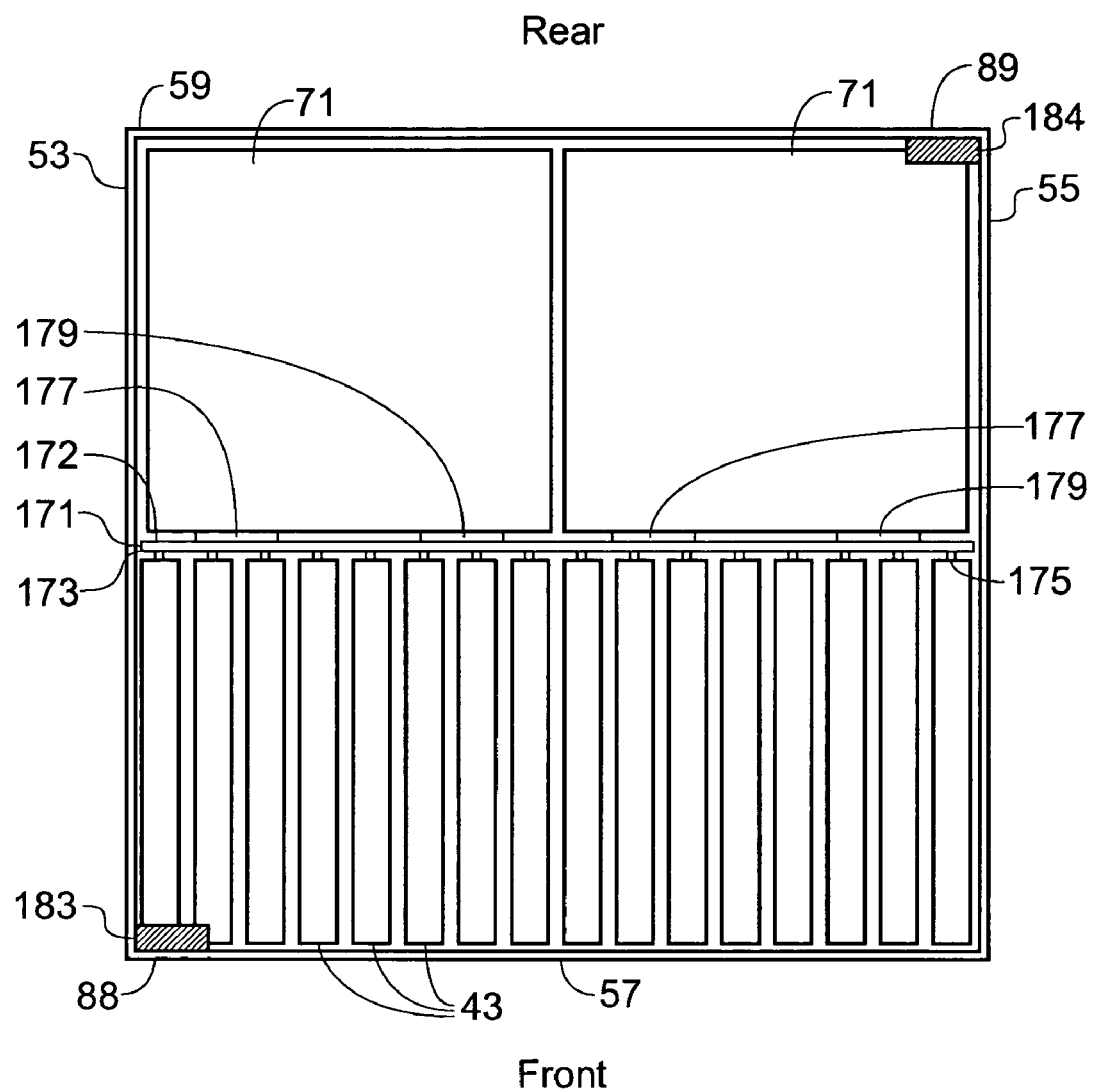
FIGS. 3A, 3B and 3C are a schematic plan view and schematic perspective views, respectively, of an example of the chassis and midplane of the shelf of FIG. 2.
Figure 3B:
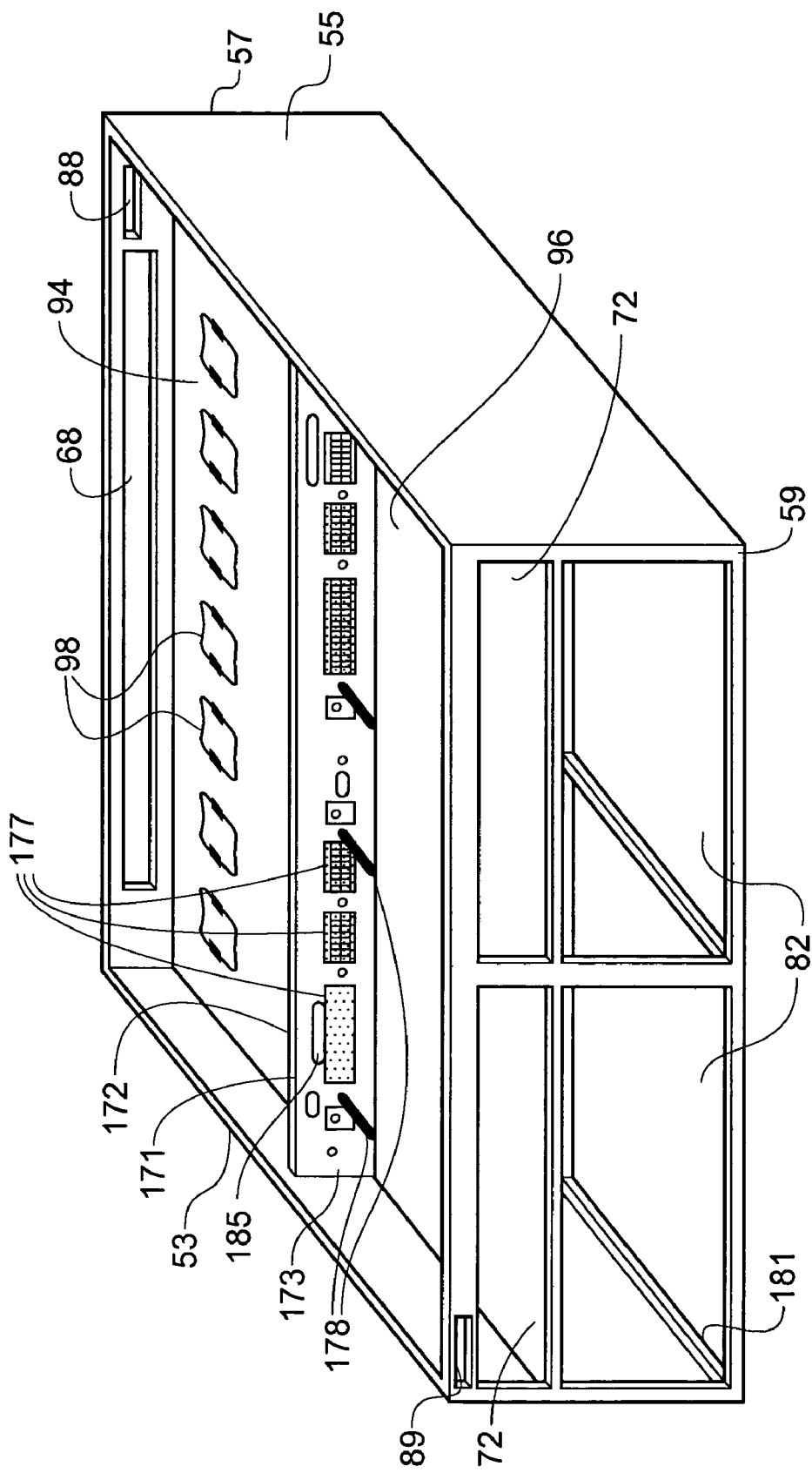
Figure 3C:
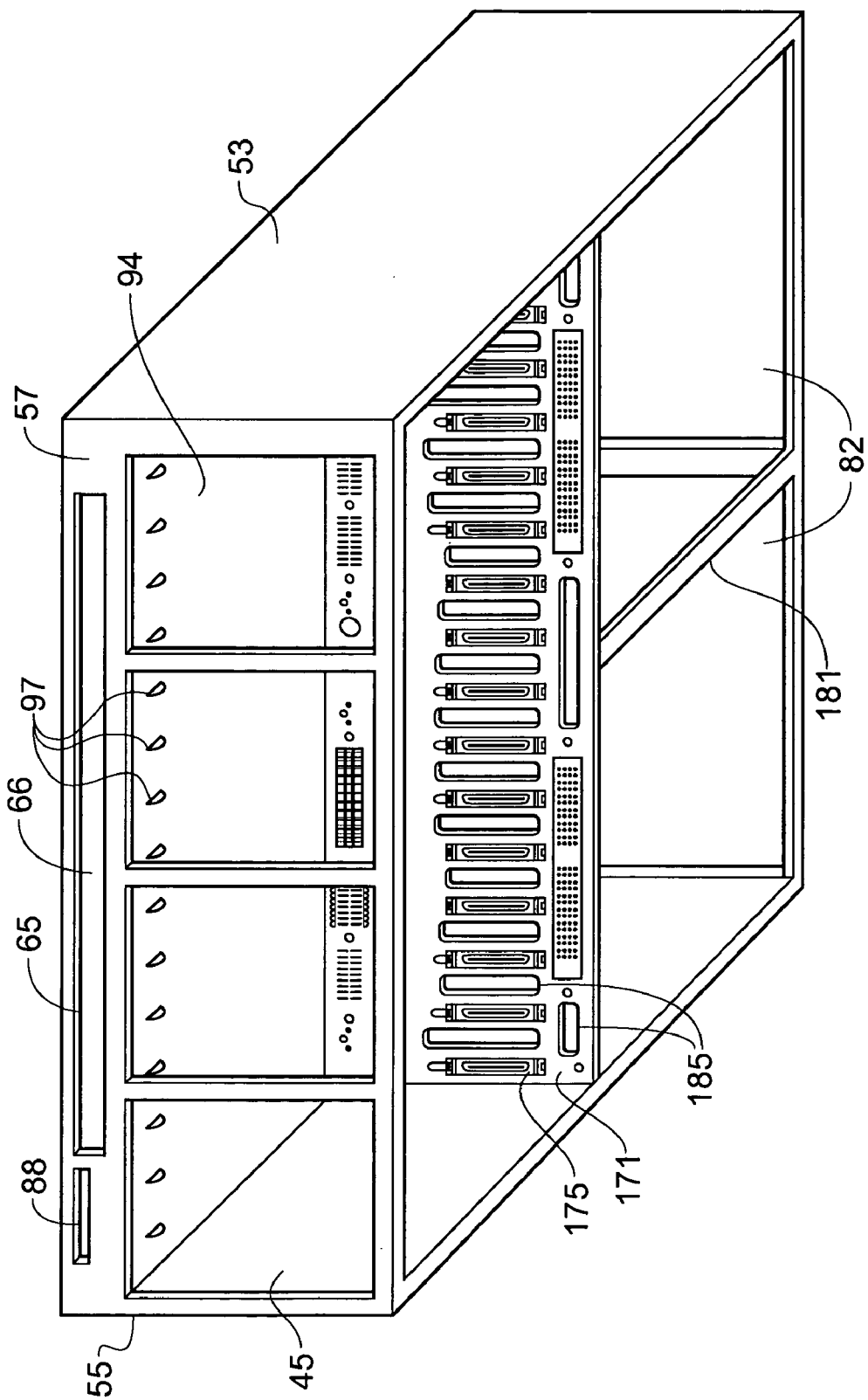
Figures 4A, 4B, 4C:
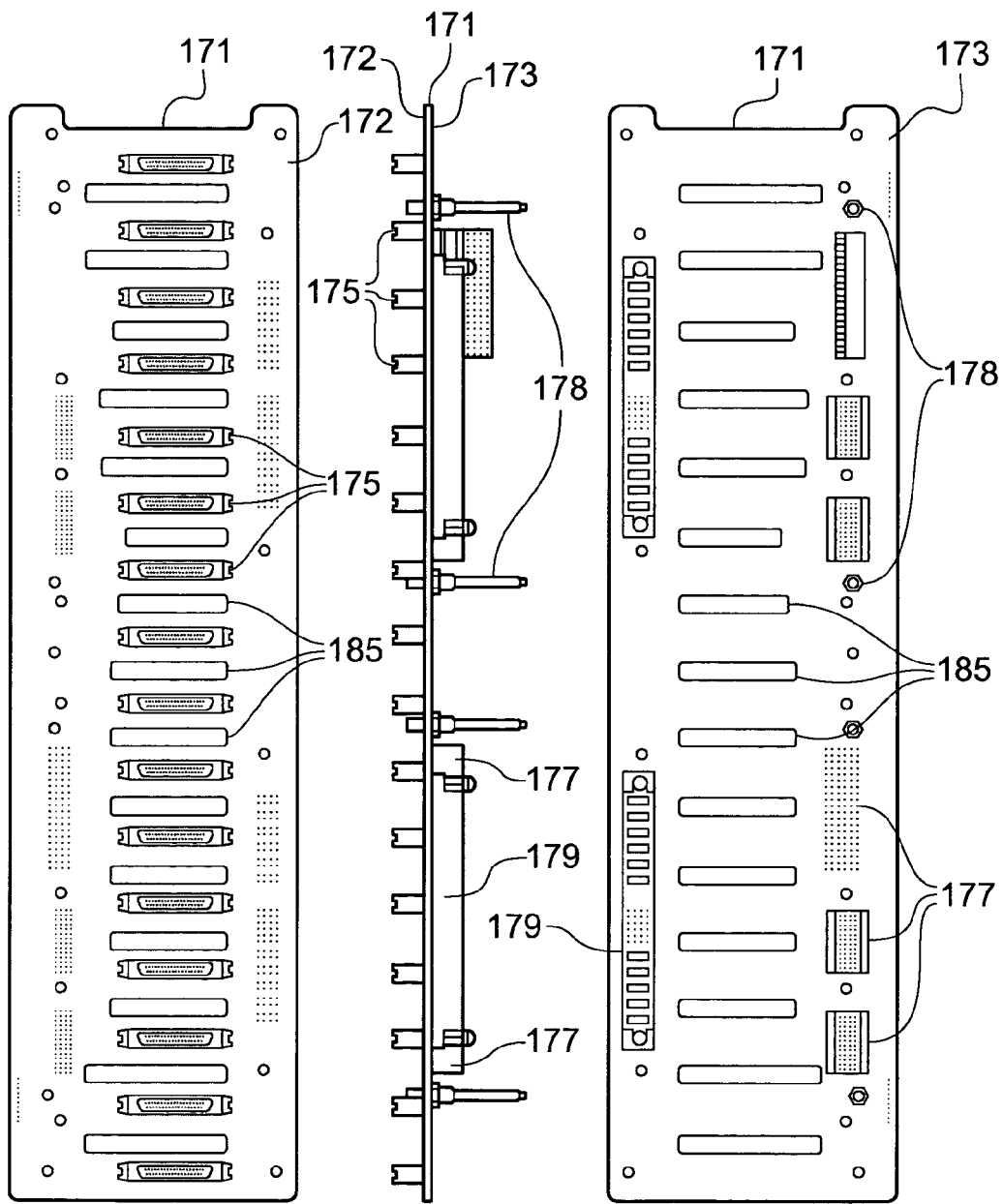
FIGS. 4A, 4B and 4C are schematic front, top and rear views, respectively, of an example of a midplane of the shelf of FIG. 2.

FIG. 3A is a schematic plan view showing the internal configuration of an example of a shelf 41 with the cover 61 removed. FIG. 3B is a schematic perspective view from above the rear of the chassis portion 47 of the shelf enclosure with the field replaceable units removed. FIG. 3C is a schematic perspective view from below the front of the chassis portion 47 of the shelf enclosure with the field replaceable units and the base 51 removed. FIG. 3D is a schematic perspective view from the front and above a part of the base 51 of the shelf 41. FIGS. 4A, 4B and 4C are, respectively, front, top and rear views of the midplane 171. In this example, the midplane is, in use, mounted vertically within the shelf 41 extending across the width W of the shelf 41 at a position approximately half way between the front and the rear of the shelf 41.

The vertically mounted midplane 171 extends, in this example, across the shelf 41 and allows for the electrical interconnection of the FRUs. The various apertures in the front and rear faces 57 and 59 of the shelf 41, in combination with the midplane 171, can be provided with guides (e.g., rails 181) and keying e.g., offset connector positioning for the insertion of the FRUs into the enclosure and midplane 171. The midplane 171 can be a double-sided, or multi-layer printed circuit board (PCB) assembly that can be mounted vertically in a rigid manner within the enclosure. It can carry connectors 175 on a front surface 172 for making electrical connection with corresponding connectors on the information processing cartridges 43. It can also carry connectors 177 and 179 on rear surface 173 for making electrical connection with corresponding connectors 141 on the CSSPs 71 and the PSUs, respectively. Conductive tracks (not shown) on and through the midplane 171 can be provided to interconnect the various connectors. In addition, the midplane can provide connectors for receiving corresponding connectors connected to first and second indicator boards 183 and 184 that each carry a respective set of LED indicators (not shown). In the present example, the midplane 171 is not configured as a FRU and is not hot swappable. It is perforated to facilitate airflow through the shelf 41. The midplane 171 can include openings 185, which co-operate with openings in the enclosures of the FRUs 43 and 81, to provide a path for cooling air to pass from the front to the rear of the shelf 41, the cooling air being driven by fans in one or more of the FRUs, for example in the PSUs, possibly also in the information processing cartridges 43.

A plenum chamber floor member 94 can extend horizontally from the front of the midplane 171 to the front face 57 of the shelf enclosure, or chassis 47. The member 94 provides a floor for a plenum chamber 66, which is supplied with air via the apertures 65 in the front bezel and, in the illustrated example, the slot shaped aperture 68 in the front face 57 of the shelf enclosure 47. Although, for reasons of ease of illustration a slot shaped aperture 68 is shown, a plurality of apertures 68 aligned with the blade receiving locations may be provided. The aperture or apertures 68 can serve both as air vents for a flow of air to the plenum chamber 66, and also as latching locations for latching portions of, for example, injector/ejector levers of processing cartridges 43 to be received within the shelf 41. The top and sides of the plenum chamber are provided by the top cover 61 and side faces 53 and 54 of the shelf enclosure 47.

A CSSP/PSU divider 96 can be provided to the rear of the midplane 171 and can extend horizontally to the rear face 59 of the shelf enclosure 47. The CSSPs 71, when inserted, are supported by the divider 96. To aid the correct insertion of the CSSPs 71, CSSP guide pins 178 are provided on the midplane 171 at positions adjacent connectors 177 on the midplane 171 for connection to the CSSPs 71.

Respective positions 88 and 89 can be formed in the front face 57 and the rear face 59 at which first and second indicator boards 183 and 184 supporting the indicator LEDs can be located. These positions 88, 89 therefore include an aperture through the respective face of the shelf enclosure 47 such that indicator LEDs mounted onto a circuit board attached to the inside of the shelf enclosure 47 may be viewed from outside the shelf enclosure.

There now follows are more detailed description of the midplane 171.

As mentioned above, the midplane 171 connects all the elements of a shelf together, including, in the present example, up to sixteen information processing cartridges 43, up to two CSSPs 71, two PSUs and the two indicator boards 183 and 184. In the present example, due to its location within the shelf enclosure, the midplane 171 is not configured to be swappable. Accordingly, to maximize the system reliability, the midplane is configured to provide as a high level of reliability as possible. To this end, the midplane is advantageously configured without active devices and to include the minimum number of decoupling capacitors consistent with good design practice (ideally zero).

The midplane supports a number of paths for various power and signal lines to interconnect the FRUs.

In the present example, each information processing cartridge 43 has a high speed information signal connection (e.g., a Gigabit (Gb) Ethernet SERializer/DESerializer (SERDES) connection) to each of the CSSPs 71, each connection consisting of two pairs of differential signals. In a conventional manner therefore, the tracking of the paths for these signals is arranged to keep the pairs well balanced and on a single signal layer (i.e. without vias) to support such differential signals at high frequency.

In addition, in the present example, each information processing cartridge 43 has a serial console connection to the CSSP cartridge 71. Each connection consists of two TTL (Transistor-Transistor Logic) level signals that make a transmit and return (TX and RX) pair.

Also, each PSU has a management signal connection (e.g., a serial I2C (Inter-IC Bus) connection) to the CSSP cartridge 71 to control power and monitor environmental parameters. The I2C bus comprises of two signals SCL and SDL (serial clock line and serial data line). In addition, an I2C address programming pin is provided for the PSUs.

Each information processing cartridge 43 and PSU can signal to the CSSP cartridge 71 that it is inserted by pulling to ground (GND) a respective Inserted_L signal (i.e., an active low signal). These signals are fed to the CSSP cartridge 71 via the midplane 171.

Each PSU has five 12 Volt output rails. The routing from each PSU is arranged so that a fault in any single FRU cannot completely interrupt the power to any other.

As mentioned above, the midplane 171 is provided with appropriate connector arrangements for receiving the connectors on the FRUs.

In the present example, each information processing cartridge 43 connects to the midplane 171 through a 40 pin Single Connector Attachment (SCA-2) connector as defined by the Small Computer Systems Interface (SCSI) standard. Accordingly, the midplane carries corresponding connectors 175.

In the present example, each CSSP cartridge 71 connects to the midplane 171 through a two right-angle 20 pair connector (e.g., 2 mm HM-Zd connectors available from Tyco Electronics). The corresponding connectors 177 on the midplane are straight male parts with a power connector. A guide pin arrangement is provided in addition to the connectors to prevent misaligned modules causing bent pins during insertion. The guide pin also provides a leading ground. The CSSP cartridge 71 also connects to the midplane 171 through a right-angled 125 way 5 row 2 mm connector. The connector 177 on the midplane 171 includes a straight male part. A guide pin arrangement is provided in addition to the connectors to prevent misaligned modules causing bent pins during insertion.

In the present example, as mentioned above, each PSU connects to the midplane 171 through an SSI-MPS specification connector. The contacts are configured 5P/24S/6P with sequenced signal (S) and power (P) pins. Where the connector on the PSU is a 1450230-1 R/A male header, solder tails connector, the mating connector 179 on the midplane can be a 1450540-2 vertical receptacle, press-fit connector.

In the present implementation, indicator boards 183 and 184 are provided at the front and rear of the system and are configured as FRUs. In this example they hold three system-level indicator LEDs and include a FRU identity (FRU-ID) programmable read-only memory (PROM) each. Three LEDs are present on the indicator board. There can, for example, be a white locator LED that can be switched by the user for locating the system; a green power-on LED to indicate when the system is powered; and an amber service-required LED to indicate a fault or other condition requiring servicing. These LEDs can be driven by the CSSP 71.

In the present example, identification information (FRU ID) for the midplane 171 is held on an I2C electrically erasable programmable read only memory (EEPROM) in the front indicator board 183. In addition to the I2C signals necessary to access the FRU ID EEPROM, the CSSPs 71 provide a current limited supply to the indicator boards 183 and 184 via the midplane. The indicator boards 183 and 184 are also provided with an I2C address programming pin. Depending on the implementation, FRU ID information can be stored instead, or in addition, on the rear indicator board 184.

As the FRU-ID for the midplane 171 is held on one or both of the indicator boards 183 and 184, the midplane can be a totally passive unit. The FRU-ID PROMs communicate with the CSSPs 71 via an I2C bus. Each device on the bus has a separate I2C address. The lower three I2C address bits of the EEPROMs used are available as pins on the device, to allow programming with resistors. The least significant bit of this address is passed to the midplane via the corresponding connector. This allows the midplane 171 to program the address of the FRU-ID differently for the front and rear indicator boards 183 and 184, by pulling the address low for the front board and high for the rear indicator board 183. This ensures that both EEPROMS are available on the bus, at different addresses. The FRU-ID for the midplane can be stored on either front or rear EEPROM, but the present example the FRU-ID is stored in the EEPROM on the front indicator board 183. The EEPROM can be 8 kByte or larger.

As mentioned above, the midplane 171 includes openings 185 to provide a ventilation path for cooling air passing through the shelf 41. The cooling air passing through the shelf 41 via the midplane 171 can be driven by means of fans provided in each of the information processing cartridges 43 and the power supply modules 81. The openings 185 could in practice have any form (i.e., a series of large openings, or a number of small perforations), arranged on the midplane to align with corresponding openings or ventilation apertures in the various field replaceable units 43, 71 and 81. In this way, the path of the airflow from the front of the shelf to the back of the shelf can be configured to be as efficient as possible, depending on the detail configuration of the fan units and the ventilation openings or apertures in the information processing, switch, service processor and power supply unit modules 43, 71 and 81. Providing the fan units in the field replaceable units 43, 71 and 81, contributes to the aim of maintaining the chassis 49 and the midplane 171 of the shelf 41 free of active components, thereby minimising cost, and facilitating maintenance. Also, by providing the fan units in each of the field replaceable units, merely inserting and removing field replaceable units automatically adapts the flow of cooling air to the number and type of field replaceable units inserted in the shelf 41.

As described above, in the present example each of the FRUs is designed to be a non-user serviceable unit. Thus each FRU presents the user with a "sealed" unit which may be inserted into and removed from the shelf 41 as desired or required. If a FRU ceases to be operable, then the user has a choice only of returning the FRU to a supplier or service company for repair or of discarding the non-operable unit. As the FRUs are non-user serviceable, there is no requirement for a skilled technician to be employed in inserting or removing the FRUs into or from a shelf 41. Thus each FRU is designed such that a non-skilled person should have difficulty in causing damage to the FRU during handling. Moreover, the configuration and construction of the FRUs (e.g., provision of injector/ejector levers, grooves in the enclosures of the information processing units, etc), of the shelf enclosure and the midplane (e.g., the guide rails to guide insertion of the FRUs, the locating pins, etc) contribute to facilitating easy insertion and removal of the FRUs.

Thus the general structure and arrangement of a computer system shelf 41 and the FRUs which it is operable to receive can be understood. As the skilled addressee will appreciate, particularly with reference to FIG. 1 above, a plurality of computer system shelves 41 may be utilised in combination to provide a large distributed processing system, for example a server farm such as a web farm.

Figure 5:
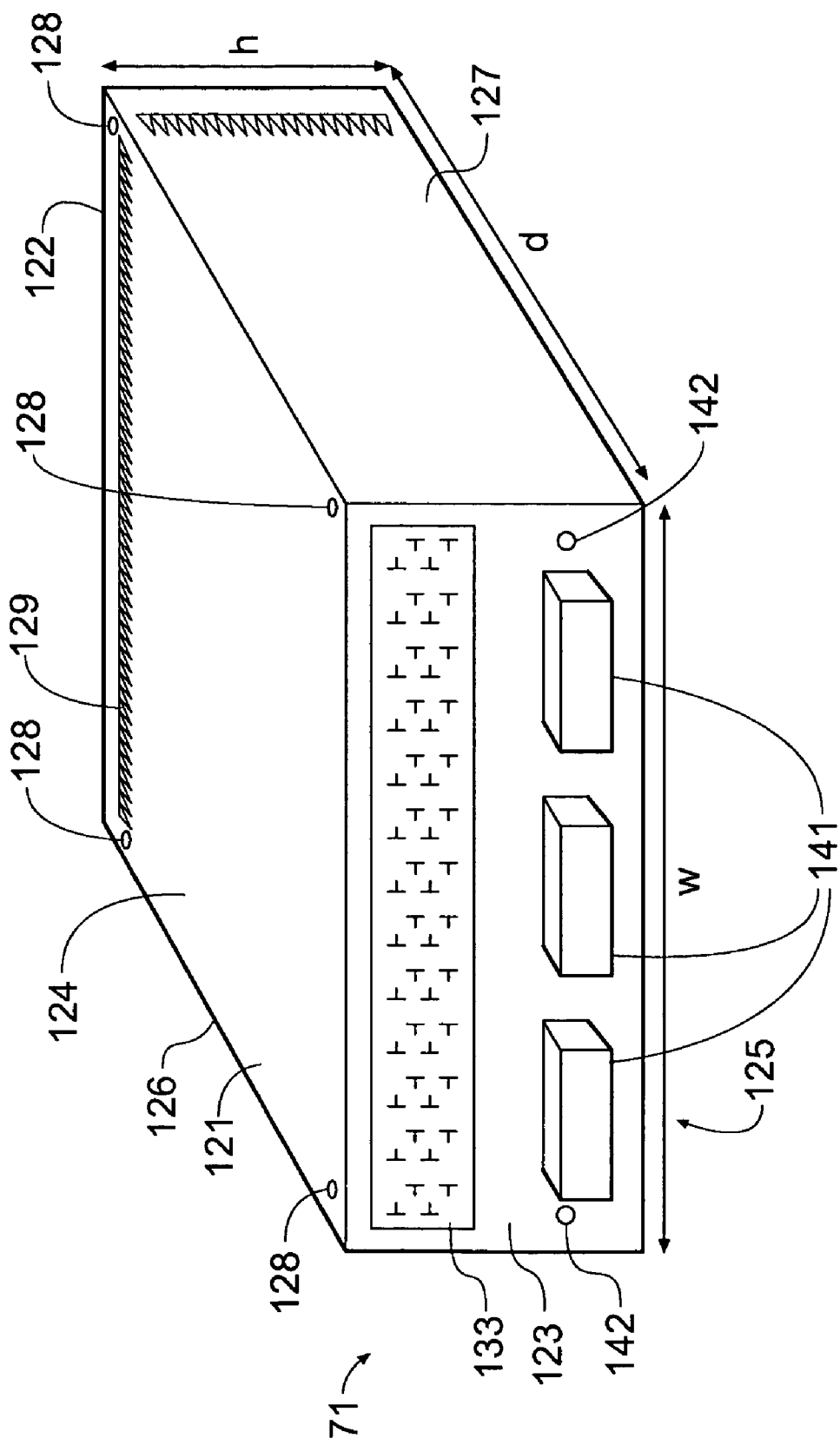
FIG. 5 is a schematic perspective view of an example of a combined switch and service processor module for mounting in the shelf of FIG. 2.

In the present example, the CSSP 71 is operable to provide flexible, high bandwidth, highly configurable interconnections between computer system shelves 41. FIG. 5 shows an example of how a plurality of computer system shelves may be interconnected in a logical stacking arrangement using the interconnections facilities provided by the CSSP 71.

FIG. 5 provides a perspective view, partly from the front, of a Combined Switch and Service Processor (CSSP) cartridge (or CSSP) 71. Here is it to be noted that the term "front" is applied in the context of the position, when installed, of the CSSP cartridge 71, with respect to the shelf 41 (i.e. in this case the "front" of the CSSP cartridge 71 is the innermost part of the CSSP cartridge 71 when it is inserted in the shelf 41).

With reference to FIG. 5, it will be noted that a CSSP cartridge 71 is three-dimensional, having a height (h), width (w) and depth (d). An enclosure 121 of present example of a CSSP cartridge 71 has six, generally rectangular, faces. For convenience only, the face that is visible from the rear of the racking when a CSSP cartridge 71 is mounted in the shelf 41 is known as the rear face 122. The opposite face is known as the front face 123. In the present example these two faces, as well as side faces 126 and 127 have the shape of elongate rectangles. The top and bottom faces 124 and 125 are also rectangular, but not elongate in the manner of the front, rear, top and bottom faces. Although in the present example the CSSP cartridges have six generally rectangular faces, as for the information processing cartridges 43 it will be appreciated that other examples could have other configurations.

In this example, the CSSP enclosure 121 is fabricated from steel sheet to form a chassis portion that includes the bottom face 125, the front and rear faces 122 and 123 and the side faces 126 and 127. A cover portion that is secured to the chassis portion forms the other top face 124. The cover portion is secured to the chassis portion by suitable fixings, for example one or more screws 128. It will be appreciated however, that in another example, other faces, or portions, of the enclosure could form the chassis and the cover portions. The provision of the enclosure 121 means that the CSSP cartridge 71 can safely be handled by an operator who is not a skilled technician. Also, through the use of the enclosure 121, the switch cartridge is a robust unit that protects its inner workings from the outside environment and vice versa. The use of a conductive enclosure, e.g., a metal enclosure, means that the CSSP cartridge includes its own electromagnetic shielding. To this end the CSSP enclosure 121 is provided with EMI fingers 129 to ensure good contact with the shelf chassis and the adjacent components.

The CSSP cartridge 71 of the present example incorporates two D-shaped handles to facilitate insertion and removal of the CSSP cartridge 71 with respect to an aperture 72 in the rear face of the shelf enclosure. A latch member can be pivotably mounted on a plate that can be secured (e.g., using screws) to the rear face of the shelf enclosure. The latch member is configured to engage one of the handles and to secure the CSSP cartridge 71 in place (not shown). In other examples, the CSSP cartridge 71 could be provided with an injector/ejector arrangement. As shown in FIG. 5, the front face 123 of the CSSP cartridge 71 has perforations 133 to allow for airflow into the CSSP cartridge 71. The rear face 122 of the CSSP cartridge 71 has perforations 135 to allow for air to be exhausted from the rear of the CSSP cartridge 71 (not shown).

At least one fan can be located, for example behind the perforated portion 135 of the rear face, in a CSSP cartridge 71 to channel cooling air through the CSSP cartridge 71 from the front to the rear. In this particular example shown, two fans are provided, one behind each set of perforations 135. LED indicators 137 can be provided on the rear face 122 of the CSSP enclosure 121 to indicate whether power is on, whether service intervention is required and whether the switch can be removed. Additional link status indicators can be provided integral to 2×4 stacked RJ-45 connectors 139. As shown in FIG. 5, electrical connections 141 can be provided at the front face of the CSSP (i.e. on the face that in use is inside the shelf enclosure 47). Suitable connections for use in the present example include a connector for power connections, a connector for serial management data connections and a connector for information connections. In the present example, information connections are implemented using an Ethernet information communication protocol, e.g. at 1 Gigabit (Gb). However other protocols could equally be used, for example the Infiniband information communication protocol. The connector arrangement can include a guide pin arrangement to prevent module misalignment during insertion of the CSSP module into the receiving location. For this purpose, guide pin holes 142 can be provided on the front face 123 into which guide pins may pass to aid module alignment.

In the present example, up to two CSSPs 71 can be mounted at any one time at the rear of the shelf unit in corresponding apertures 72 in the rear face of the shelf enclosure 47. The number of CSSPs 71 provided in any particular implementation depends upon system configuration and the need, or otherwise, for redundancy.

It will be appreciated that one possible construction of the CSSP cartridge 71 has been described and that as for the information processing cartridge 43, other examples could employ other materials and/or constructions.

Figure 6:
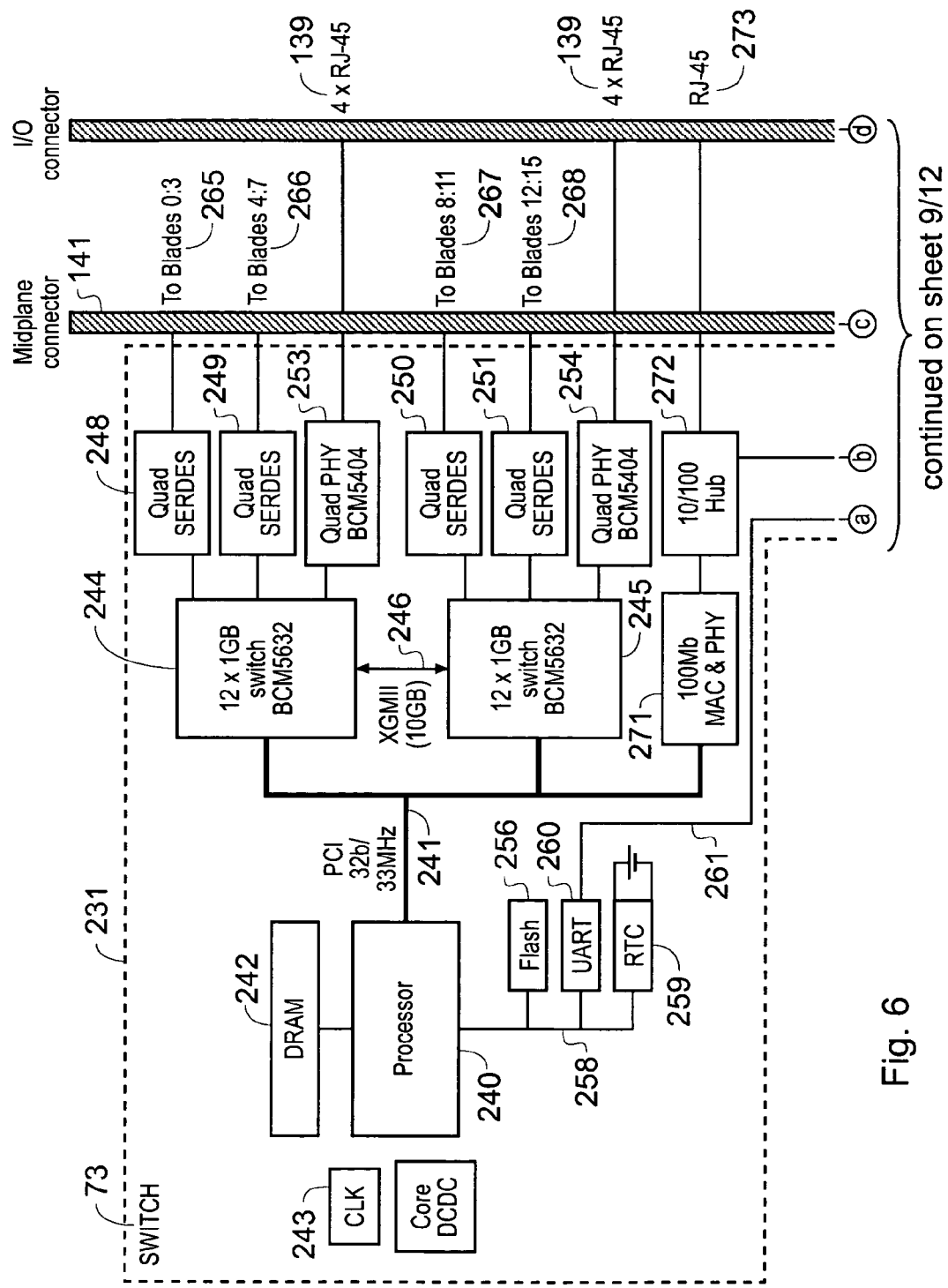
FIG. 6 is a functional block diagram of an example of an information processing subsystem for the combined switch and service processor module of FIG. 5.
Figure 6:
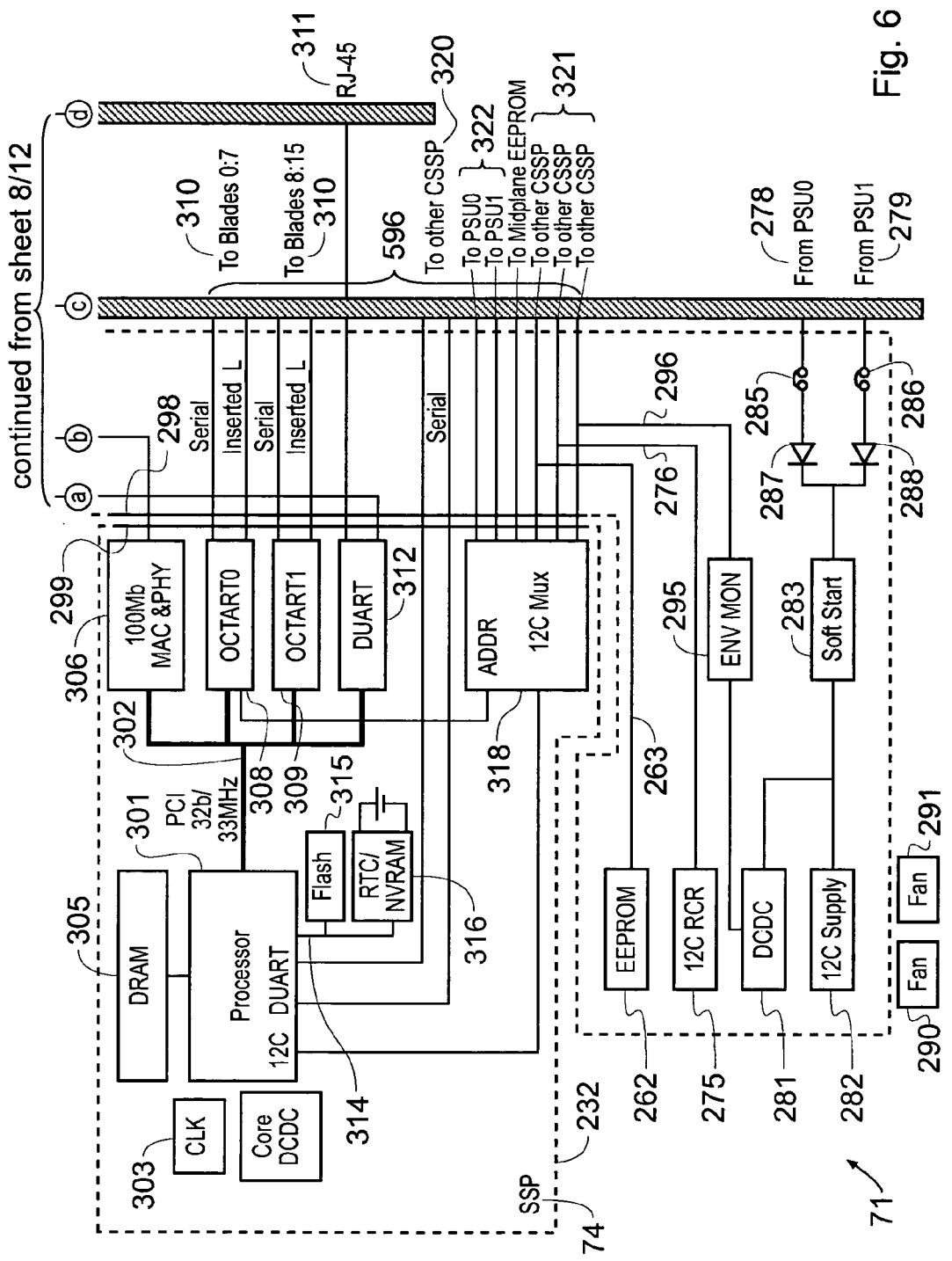

With reference to FIG. 6, there now follows a description of an example of a combined switch and service processor (CSSP) 71. In the present example, each CSSP 71 provides the functionality of a Switch 73 and of a Shelf Service Processor, or Shelf Service Processor (SSP) 74.

FIG. 6 provides an overview of the functional components of the CSSP 71 including functional components of the Switch 73 and functional components of the SSP 74. In the present example, most of the components relating to the Switch 73 are mounted on a Switch PCB 231, and the components relating to the SSP 75 are provided on a SSP PCB 232. However, it should be noted that the components located in the lower portion of the switch PCB 321 (i.e., that portion below the SSP PCB 232 as illustrated in FIG. 6 logically belong to the SSP 74, rather than to the switch 73. It will be appreciated that such component arrangements are not necessary for successful operation and that any other component arrangement over any number of component boards can be easily achieved using conventional component arrangement techniques.

Firstly, with reference to FIG. 6, there follows a description of functional elements of the Switch portions 73 of a CSSP 71 as contained within the CSSP enclosure 121.

The midplane connector 141 on the CSSP 71 establishes the connection between the CSSP 71 and the midplane 171. In the present example, it supports up to 84 connections (pins) that will deliver SERDES outputs 265-268, I2C signals 310, 320, 321 and 322, and power 278, 279. Signal connections may be made through two 20-pair right-angled connectors. Power connections may be made through a right-angled connector. The connector can be configured to facilitate hotswapping of the board, for example with a low insertion force. The connector also uses guide pins to increase the ease of serviceability and prevent module misalignment during insertion.

A switch microprocessor 240 is provided, along with associated memory 242. The processor 240 can be connected to a PCI bus 241. A clock input to the processor 240 can be provided by a clock generator (CLK) 243. The CLK 243 can include a configurable clock generator (not shown) implemented as a programmable clock synthesiser employing a crystal used to produce CPU clock signals. The clock frequency can be determined by jumper settings (not shown). A vectored interrupt controller (I-Chip) (not shown) and a configurable core voltage regulator module (VRM) (not shown) can be provided.

In the present embodiment two switch ASICs (application specific integrated circuits) 244, 245 are provided. Each ASIC can provide twelve GMII Interfaces (1 Gigabit Ethernet) (for uplinks and downlinks) and one 10 Gb XGMII interface for chip-to-chip communication (bridging) 246 between the ASICs 244 and 245. Sixteen GMII 1 Gb 'downlinks', in the form of serialized Gb Ethernet data, are provided through four quad SERDES 248-251 to allow each information processing cartridge 43 to communicate with the switch 73. Eight GMII 1 Gb 'uplinks' are provided for external communication through two quad PHYs 253 and 254 (in the present example BCM5404 ASICs) and RJ45 connectors on the rear panel 122. The ASICs 244 and 245 are configured via a PCI to the PCI bus 241.

A Flash PROM 256 can store a real time operating system, and management and configuration data for the microprocessor. The Flash PROM 256 in the present example can be operable to hold 8 MB-16 MB of data, depending on the software required. The flash PROM 256 can be operated via an on-chip XBus 258.

Also connected to communicate with the processor 240 via the XBus 258, a Real Time Clock (RTC) 259 can be provided for real-time functions with a back-up battery.

Also connected to the XBus 258 can be a UART (Universal Asynchronous Receiver Transmitter) 260 which in turn connects to a serial bus 261 for providing an asynchronous console connection from the switch 73 to the SSP 74 which can be accessed by the SSP.

An integrated MAC/PHY (Media Access Control/Physical) switch 271 can provides its own interface to the PCI bus 241. This MAC/PHY switch 271 can connects to a 10/100 Ethernet hub 272. The hub 272 can be operable to provide a management interface to the SSP 74 and a connection from an external management network to the switch 73 and SSP 74 of a given CSSP 71. The connection from the integrated MAC/PHY device 271 to the SSP 74 can be coupled capacitively. A loopback mode can be provided by the MAC/PHY device 271 for system diagnostics. The hub 272 can connect to an RJ45 connector 273 on the rear panel 122 of the CSSP enclosure 121.

An 8 kByte I2C EEPROM 262 can be used to store the FRU-ID and is accessible by the SSP portion 74 of each CSSP 71 via a serial bus 263 and the midplane 171. The upper 2 kByte of the EEPROM 262 can be configured to be write protected.

An I2C Redundant Control Register (RCR) 275 can be used to provide an alternate, redundant path for powering-down the CSSP 71 and Shelf Level Indicators mounted on the front 57 and rear 59 panels of the shelf 41. The I2C RCR 275 can be accessible by both the SSP 74 of the CSSP 71 containing the RCR and the SSP 74 of a further CSSP 71 connected via the midplane 171 via an I2C bus 276.

With continued reference to FIG. 6, there now follows a description of functional elements of the Shelf Service Processor (SSP) portion 74 of a CSSP 71 as contained within the CSSP enclosure 121 and provided on an SSP PCB 232.

In the present example, communication between the Switch PCB 231 and the SSP PCB 232 is facilitated by an interboard connector pair 298 and 299. It supports connections (pins) for I2C signals, 10/100 MAC/PHY output, and power. As described above, the switch PCB 231 carries the components associated with the switch, and it also carries the power, FRU-ID and environmental monitoring components along with the connectors for connections to the midplane 171 and external connectors. Thus, in the present example, all SSP components requiring a connection to the midplane 171 or an external connection have signal paths routed through the connector pair 298, 299 and via the switch PCB 231 to the relevant midplane or external connectors.

In the present example, the SSP 74 includes a microprocessor 301 mounted on the SSP printed circuit board (PCB) 232. The processor 301 can be connected to a PCI bus 302.

A clock input to the processor 301 can be provided by a clock generator (CLK) 303. The CLK 303 can comprise a configurable clock generator (not shown) implemented as a programmable clock synthesiser employing a crystal used to produce CPU clock signals. The clock frequency can be determined by jumper settings (not shown). A vectored interrupt controller (I-Chip) (not shown) and a configurable core voltage regulator module (VRM) (not shown) can be provided.

The processor 301 can be provided with memory 305. The memory capacity can be chosen to suit the processor addressable memory space.

An integrated MAC/PHY switch 306 can provide its own interface to the PCI bus 302. The MAC/PHY switch 271 can be connected to 10/100 Ethernet hub 272 via the interboard connectors 298, 299. A loopback mode can be provided by the MAC/PHY switch 306 for system diagnostics.

Octal UARTs 308 and 309 can be connected between the PCI bus 302 and the interboard connector pair 298, 299. The signal path can be continued from the interboard connector pair 298, 299 to serial connections 310 on the midplane connector 141 on switch PCB 231. The Octal UARTS 308, 309 can facilitate serial communications between the SSP 74 and each of the processing cartridges 43.

Also connected to the PCI Bus 302 can be a dual UART (DUART) 312 that in turn can connect via the interboard connectors 298, 299 to serial bus 261 for providing an asynchronous console connection from the SSP 74 to the switch 73. The DUART 312 can also have an I2C connection to an external connector on the rear face 122 of the CSSP enclosure 121. The external connector can provide a common operating system/boot console and command port 311.

Connected to the processor 301 via an XBus 314 can be a Flash PROM 315. The Flash PROM 315 can store a real time operating system, and management and configuration data for the microprocessor 301. The Flash PROM 315 can be operable in the present example to hold up to 2 MB of data, depending on the software required.

Also connected to the processor 301 via the XBus 214 can be a real time clock (RTC) 316 for real-time functions with a backup battery. The RTC 316 can also provide 8 kByte of non-volatile random access memory (NVRAM), in the present instance implemented as an EEPROM. This can be used to contain information such as the FRU-ID, a serial number and other FRU information.

To facilitate I2C communications between the SSP 74 and the other CSSP 71, the midplane 171 and the PSUs, a multiplexer 318 can be provided. The multiplexer 318 can have a single I2C connection to the processor 301 and connections, via the interboard connector pair 298, 299 and the midplane connector 141 to both PSUs, the midplane 171 and the other CSSP 71.

The processor 301 can also comprise an embedded DUART to provide a redundant serial link to the SSP 74 of the other CSSP 71. Although it would be possible to implement this link using an external DUART, the advantage of using an embedded DUART is that the connection to the other CSSP is reliable and therefore likely to be functional. Where the embedded DUART link does not use the I2C Multiplexer for communications to the other CSSP, a common mode of failure for both the SSP-SSP I2C links can be avoided, it being assumed that the processor 301 is likely to be functional even if both embedded DUART channels are non-functional.

The CSSP 71 can powered from two, diode commoned, power supply rails 278 and 279. DC/DC converters 281 can be used to provide the voltage levels required by the CSSP 71. The DC/DC converters 281 can be supplied by dual power inputs 278, 279, individually fused 285, 286 and then diode commoned 287, 288. A soft start controller 283 can be provided to facilitate hot-insertion. An I2C power regulator 282 can be turned on as soon as the CSSP 71 is fully inserted. A DC/DC converter 281 can be turned on when instructed, for example through SSP service software. The converter 281 converter can be arranged to turn a plurality of different voltage rails appropriate to the different components within the CSSP 71.

When the CSSP 71 is inserted the inrush current can be limited and the rate of rise can be configured not to exceed a predetermined value to provide a so-called soft start to facilitate hot-insertion. The intent is to prevent damage to the connectors and to avoid generating noise. A soft start controller 283, which controls a ramping-up of voltage levels, can be enabled when a predetermined signal is asserted. In the present example, this signal is on a short pin in the connector and is connected to ground (not shown) through the midplane 171 until one of the supplies is removed. These circuits can be configured to withstand an overvoltage at their inputs whilst the input they are feeding is not powered, without any leakage to the unpowered circuit. A sense circuit can detect if the voltage has dropped below a threshold as a result of a blown fuse, a power rail going down, etc. The DC/DC converters 281 can be protected against short circuit of their outputs so that no damage occurs.

The I2C regulator 282 can be powered as soon as the CSSP 71 is fully inserted into the midplane 171. This can be facilitated through short pins connected to the soft start controller 283, which controls a ramping-up of voltage levels. The other DC/DC regulators can be turned on, for example by SSP software.

A pair of fans 290, 291 can provide cooling to the CSSP 71. The fans 290, 291 can be configured to run at full speed to prevent overtemperature conditions by minimizing the temperature of the internal components and the fan. The speed of the fans 290, 291 can be monitored by the SSP 74 through an environmental monitor 295 on the switch board 231. The environmental monitor 295 can be alerted in the event of the fan speed falling below a predetermined value (e.g., 80% of its nominal speed). The fan can provide tachometer outputs to facilitate the measurement of fan speed.

LED indicators 137 can be provided, for example with a green power LED, an amber LED for indicating that service is required and a blue LED for indicating that the switch is ready to be removed. LED indicators integrated on 2×4 stacked RJ45 connectors on the rear face of the CSSP 71 can be arranged, for example, to show green continually when the link is present and flash green when the link is active.

The environmental monitor ENV MON 295 can be provided to maintain operational integrity of the CSSP 71. The ENV MON 295 can include limit values in limit registers and can monitor, for example, temperature within the CSSP enclosure 121 and the CSSP power rails. The outputs of the DC/DC converters 281 can be fed directly to the ENV MON 295 for Watchdog type monitoring. As noted above, the ENV MON 295 can also monitor the operating speeds of the fans 290 and 291. The ENV MON 295 can communicate with the SSP 74 of both CSSPs via an I2C bus 296.

For IO to the midplane 171 shown in FIGS. 4A-4C, the midplane connector 141 can include sixteen 1 Gb Ethernet connections 265-268 from four quad SERDES 248-251 and the I2C bus lines 596.

The SSP 74 can access the I2C devices (FRU-ID EEPROM, 8-bit I/O expansion chip, and the system hardware monitor) through the midplane 171.

For external IO, rear panel Gb Ethernet connections can be provided from the two quad PHYs 253, 254 to 2×4 stacked RJ45 connectors 139 (to give 8 uplinks). Each port can be an independent 10/100/1000 BASE-T (auto negotiating) port. The PHY devices 253, 254 can operate in GMII mode to receive signals from the 8-Gigabit interfaces on the ASICs 244, 245.

Figure 7:
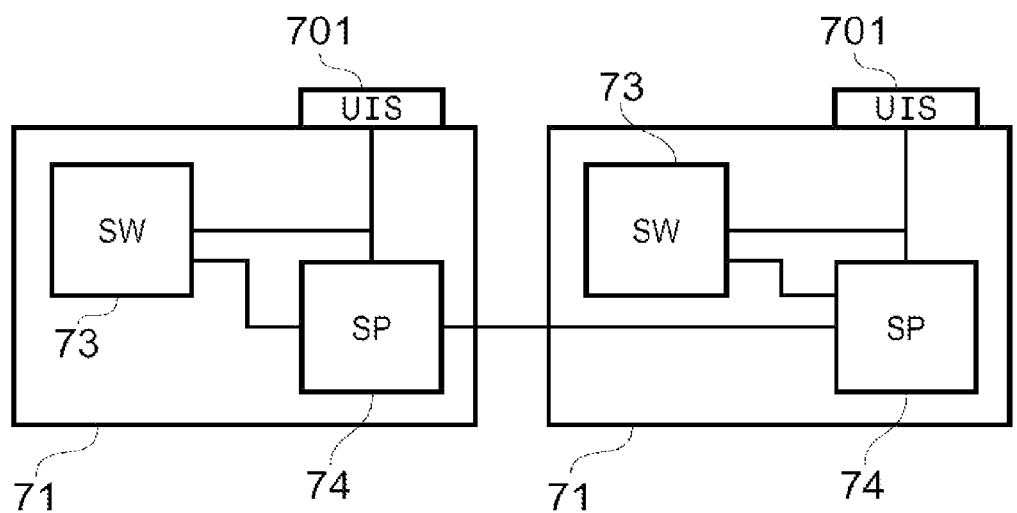
FIG. 7 is a schematic representation of the division of tasks with the system of FIG. 6.

With reference to FIG. 7, there will now be described the interrelationship between the switch and service processor portions of the CSSP 71 and the way in which those portions interface with an external management system, for example the SMS, management network and console described with reference to FIG. 10 below.

With reference to FIG. 7, each CSSP 71 is logically as well as physically divided into separate switch 73 and service processor 74. The switch 73 and service processor 74 are linked by a serial UART connection 261 between switch UART 260 and service processor DUART 312. They are also linked by a 100 Mb Ethernet connection between switch 100 Mb MAC & PHY 271 and service processor 100 Mb MAC & PHY 306 via the 10/100 hub 272. It is through the hub 272 that a connection is also provided (via RJ-45 socket 311 on the CSSP I/O panel) for an external management interface. It is via this external management connection that the management user interfaces 701 of the switch 73 and service processor 74 may be accessed. This is shown schematically in the Figure.

Also, where more than one CSSP 71 is installed in a shelf, the CSSPs 71 can communicate with one another via the I2C connections 321 and the backup DUART connection 320 which are both routed via the midplane 171.

In the present example, the service processors 74 in multiple CSSPs 71 in a single shelf 41 interact in a master/slave relationship. Thus one service processor 74 (the master) controls all service functionality for the entire shelf and the other (the slave) minors the behaviour of the master such that if the master fails for any reason (e.g. failure of the service processor itself or failure of a communications path to that service processor) the slave can take over as master with minimal performance impact on the computer system. The switches 73 of the present example operate as equal peers and, as can be seen from FIG. 7, have no direct communications path between them.

In the present example, the user interfaces 701 are set up to allow a single point of access to all of the management facilities within a given shelf. As such the external management access passes through the master service processor 74. In order to ensure conformity between the master and slave service processors, an automated synchronisation of parameters between the two service processors 74 can be used. The same automated synchronisation process can also be used to synchronise the operational parameters of the switches 73. Thus configuration information passed to a shelf via the master service processor 74 may be automatically configure all of the switches in the shelf identically. Examples of the configuration information which may be used to configure the switches 73 include permissions for particular processing cartridges and broadcast groups/families.

In the event of a failure of a service processor, it is still possible to configure the switch 73 in the CSSP 71 containing the failed service processor 74 via the direct user interface connection between the switch 73 and the external management connections of that CSSP 71.

In one example, the switches can be managed such that although the switches are peers, one is more in charge than the other(s). This in charge switch can then be the originator of the configuration information for the automatic synchronisation of switch parameters. Once the in charge switch has been configured by an external management entity, its parameters can be automatically synchronised to the other switches. This arrangement is not limited to an initial configuration, changes to the switch parameters can also be updated from the external management entity to the in charge switch and the updated parameters then automatically passed to the other switches to ensure synchronisation of configuration. Examples of events which could require changes to switch parameters include removal/failure/shutdown of a processing cartridge, insertion/startup/recovery of a processing cartridge, a change in function of a processing cartridge or a change in an external data or processing entity.

This one switch in charge system can be applied across multiple shelves. For example a group of shelves may be deployed together as a so-called "server farm" or "web farm" and a single external management entity responsible for the management of the entire server farm can update the configuration parameters of a single in charge switch in one of the shelves within the server farm and those updated parameters are then automatically passed to all of the other switches within the server farm to ensure synchronised configuration.

In order to provide for full and accurate management of the CSSP 71 and by the service processor 74 therein, it is necessary that the switch 73 and service processor 74 are assigned different IP addresses. In the present example, each FRU (CSSP 71, PSU or processing cartridge 43) is configured to obtain a dynamic IP address upon installation into a shelf (or upon reboot/startup etc) using DHCP (Dynamic Host Configuration Protocol).

In the present example, each FRU within a shelf is normally assigned an IP address dependent on the shelf in which it is installed. In order to achieve this, the CSSP 71 upon startup/reboot obtains the FRUID data from the midplane 171. This FRUID data is unique to the shelf (as the midplane is typically not field replaceable) and is usually stored in an EEPROM co-located with one of the LED indicator boards 183 or 184, which EEPROM is directly addressable by the service processor 74 via the midplane 171. Each FRU then uses an identifier including both the shelf-specific FRUID data and a FRU-specific ID for performing DHCP configuration. In the case of the CSSP 71, the switch 73 and the service processor 74 each perform DHCP configuration such that each obtains a different IP address. The identifier used by the switch 73 or service processor 74 for DHCP configuration may take the form: <shelf_ID; CSSP_ID; switch_or_service-processor>.

In order to further simplify management of a shelf by an external management entity, it is possible to provide only a single user interface to each CSSP 71 (the UI for the service processor 74) and to perform configuration and management of the switch 73 via the service processor 74. From an external management point of view this method provides a simple and intuitive system as all management for a given shelf is performed via a shelf-level management entity (the service processor 74).

This arrangement also allows the management interface of the switch 73 to be simplified. Taking the example of the command line interface (CLI), the service processor CLI is operable to perform authentication and encryption/decryption operations with an external management entity. However, as all management of the switch 73 is performed via the service processor 74, the switch CLI has no need for any of that functionality. Similarly, in the case of the GUI (which typically operates over the network connections) the switch GUI can work on information only (e.g. http content) and all authentication and encryption/decryption are provided by the service processor 74.

It should be noted that although the above described system removes the direct management link from switch to external management entity, it does not introduce a single point of failure into the shelf. A second CSSP 71 can still be provided in the shelf (which can configure the switch of the other CSSP if a service processor fails). Also, in practice, many failures which cause a service processor to fail also cause the switch on the same CSSP to fail.

One management problem which can arise in the CSSP of the present example is where the major components (e.g. switch CPU and service processor CPU) are produced by different manufacturers. In this case there can be a conflict of data regarding the FRU manufacturing data such as production date, production time, and serial number. It is important for the data for both parts of the CSSP to be accessible, but it is also important that the CSSP as a whole is referenced with a single set of data for both devices' user interfaces.

To avoid this difficulty, it is possible to configure the service processor 74 as master of the inventory and manufacturing data as it is normally the first point of access for system servicing. The service processor 74 can thus pass the correct data from (the FRUID) to the switch 73 upon initialisation. This data is then stored by the switch 73 in non-volatile memory (e.g. FLASH memory) in addition to its own hardware tracking and manufacturing data. Thus the switch 73 then provides the data provided by the service processor 74 (obtained from the FRUID) as its primary output, but is also able to output its original manufacturer's data if required.

Another management issue which may affect the computer system of the present example is that of multiple error reporting. That is, a single fault such as failure of the processing cartridge 43 may cause a number of different error reports to be generated, e.g. a SNMP (Simple Network Management Protocol) error from the switch and an email error from the service processor. This may be avoided by providing a fault management unit within the service processor 74. The fault management unit receives all error messages generated within the CSSP 71 and performs rationalisation processing before passing error messages on to an external management/service entity.

Thus, in practice, once a terminal fault error message is generated and passed on with respect to any given FRU, all further messages relating to that FRU can be ignored and are therefore not passed on to the external management/service entity. For example, if a processing cartridge 43 unexpectedly powers down, the service processor 74 will notice this and generate a fault message. In addition, the switch 73 will notice a stop in data flow from that processing cartridge 43 and also generate a fault message reporting that fact. The fault management unit receives the report from the service processor and notifies the external service/management entity that the particular processing cartridge 43 has unexpectedly powered down. The fault management unit also receives the report from the switch 73 and notices that, as the processing cartridge 43 has powered down, it is no surprise that there is no data flow from it. The fault management unit therefore does not pass on the error message relating to data flow.

This system also allows more intuitive fault fixing. For example if a processing cartridge 43 hangs (i.e. experiences a software error which causes operations to halt but does not shut down the processing cartridge 43), the hang may occur such that erroneous data is repeatedly output via the network port to the switch 73. The switch 73 will notice this happening and will shut down that network port so as to be able to ignore the erroneous data and report the error to the fault management unit. The fault management unit will also be notified by the service processor 74 that an error has occurred with that processing cartridge 43. The fault management unit will record the error messages and pass on details of the failure to the external management/service entity. Subsequently, and attempt is made to restart the processing cartridge 43. An instruction is received from the external management/service entity to restart the processing cartridge 43. The fault management unit is consulted and as a result it is discovered that the switch 73 has shut down its network port relating to that processing cartridge 43. Thus the service processor 73 can increase the likelihood of the restart working by instructing the switch 73 to re-open the relevant network port so that if the reboot of the processing cartridge 43 works, that processing cartridge 43 will be able to communicate via the switch. In the absence of such a system, it is possible that the reboot would be judged a failure regardless of actual success or failure as the data communication channel to and from the processing cartridge would remain closed.

Figure 8:
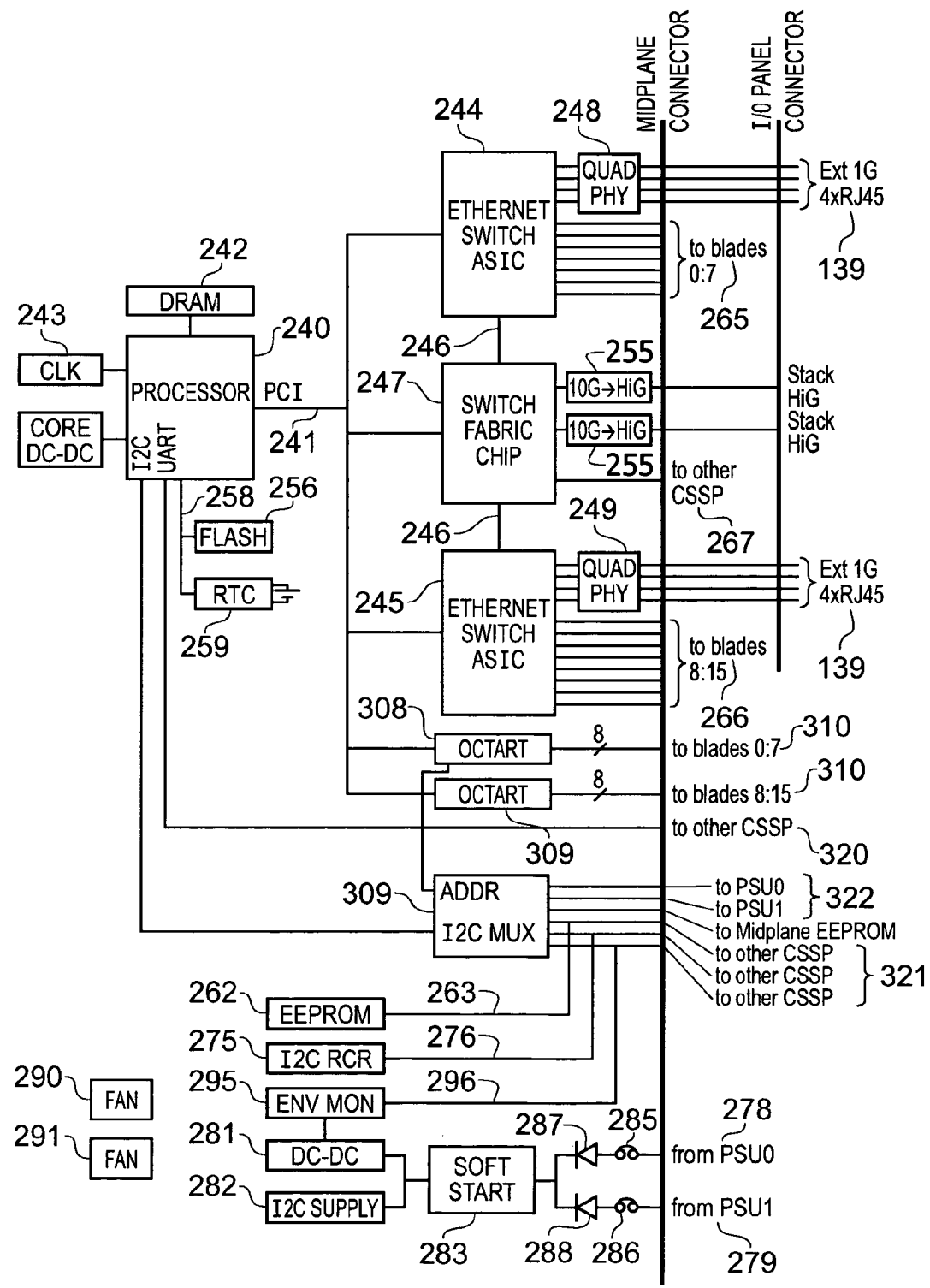
FIG. 8 is a functional block diagram of another example of an information processing subsystem for the combined switch and service processor module for the shelf of FIG. 5.

With reference to FIG. 8, there now follows a description of another example of a combined switch and service processor (CSSP) 71. In the present example, each CSSP 71 provides the functionality of a Switch 73 and of a Shelf Service Processor 74.

There now follows, with reference to FIG. 8, a description of the functional elements of a CSSP 71 as contained within a CSSP enclosure 121 receivable within a shelf enclosure. Components in common with the example of FIG. 6 are assigned like reference numerals and a detailed description thereof will not be repeated in this example.

FIG. 8 provides an overview of the functional components of the CSSP 71. In the present example, the two functions are provided by common components mounted to a single circuit board. It will be appreciated that such component arrangements are not necessary for successful operation and that any other component arrangement over any number of component boards can be easily achieved using conventional component arrangement techniques.

The midplane connector 141 on the CSSP 71 establishes the connection between the CSSP 71 and the midplane 171. In the present example, it supports up to 84 connections (pins) that will deliver SerDes Ethernet outputs 265-267, I2C signals 310, 321 and 322, and power 278, 279. Signal connections may be made through two 20-pair right-angled connectors. Power connections may be made through a right-angled connector. The connector can be configured to facilitate hotswapping of the board, for example with a low insertion force. The connector also uses guide pins to increase the ease of serviceability and prevent module misalignment during insertion.

A switch microprocessor 240 is provided, along with associated memory 242. It further includes an Embedded Programmable Interrupt Controller (EPIC) that provides 5 hardware interrupts (IRQs) or 16 serial interrupts. The processor 240 can be connected to a PCI bus 241.

In the present embodiment two Ethernet switch ASICs (application specific integrated circuits) 244, 245 are provided. The ASICs 244, 245 of the present example comprise integrated SerDes (serialiser/deserialiser) functionality. Each ASIC can provide twelve GMII Interfaces (1 Gigabit Ethernet) (for uplinks and downlinks) and one 10 Gb XGMII interface for chip-to-chip communication (bridging) 246 between the ASICs 244 and 245. Sixteen GMII 1 Gb 'downlinks', in the form of serialised Gb Ethernet data, are provided to allow each information processing cartridge 43 to communicate with the switch 73. Eight GMII 1 Gb 'uplinks' are provided for external communication through two quad PHYs 248 and 249 (in the present example BCM5404 ASICs) and RJ45 connectors on the rear panel 122. The RJ-45 connectors used in the present example have integrated LED indicators and magnetics. The ASICs 244 and 245 are configured via a PCI interface (32 bit/33 MHz) to the PCI bus 241.

Also provided is a single Switch Fabric Chip 247. The switch fabric chip 247 of the present example can provide eight 10 Gb XGMII interface ports. Of these eight interface ports, five are used in the present example. Two ports are used for communication between the Switch fabric chip 247 and the Ethernet Switch ASICs 244, 245 via the bridging 246. Two more 10 Gb ports provide the HiGig™ 'stack uplinks' for external communication via the stack through 10 Gb to HiGig™ interface ICs 255 and 10GCX4 connectors on the rear panel 122. One port provides a 10 Gb 'crosslink' 267 for reliable communication with the other CSSP received within the shelf 41 via the midplane.

Thus data connections to the information processing cartridges, stack connections, external 'uplink' connections and inter-CSSP connections are provided in the present example of a CSSP by the Ethernet Switch ASICs 244, 245 and the Switch Fabric Chip 247. In the present example, the external 'uplink' 1 Gb Ethernet connections are configurable under software control to provide for data or management connections. Thus each CSSP 71 may be connected to a management network via one or more of the external 1 Gb 'uplinks' (which may be grouped together to be treated as a single multiple of 1 Gb connection). In order to provide maximum flexibility in the utilisation of the 'uplink' connections, all of the 'uplinks' may be connected into a single physical network and the total available bandwidth may be soft-configured into different virtual networks (VLANs). Thus data and management information may flow across a single physical network, but be divided such that the data and management networks appear totally separate from one another. The provision of a connection of this bandwidth provides sufficient capability for software deployment to information processing cartridges to be performed across a management network connection.

An 8 kByte I2C EEPROM 262 can be used to store the FRU-ID of the CSSP and is accessible by each CSSP 71 via a serial bus 263 and the midplane 171. The upper 2 kByte of the EEPROM 262 can be configured to be write protected.

An I2C Redundant Control Register (RCR) 275 can be used to provide an alternate, redundant path for powering-down the CSSP 71 and Shelf Indicator boards 183, 184 mounted at the front 57 and rear 59 panels of the shelf 41. The I2C RCR 275 can be accessible by both CSSPs 71 via a serial bus 276 and the midplane 171. In the present example, a device suitable for use as the RCR 275 is a Phillips PCF8574 IC.

To provide management connections to each of the information processing cartridges of the shelf, Octal UARTs 308 and 309 can be connected between the PCI bus 302 and serial connections 310 at the midplane connector 141. The Octal UARTS 308, 309 can facilitate serial communications between the CSSP 71 and each of the processing cartridges 43.

To facilitate I2C communications between the CSSP 71 and the other CSSP 71 received in the shelf, the midplane 171 and the PSUs, a multiplexer 318 can be provided. The multiplexer 318 can have a single I2C connection to the processor 240 and connections, via the midplane connector 141 to both PSUs, the midplane 171 and the other CSSP 71.

The processor 301 can also comprise an embedded UART (or at least one channel of an embedded DUART or other 'multi'-UART) to provide a redundant serial link 320 to the SSP 74 of the other CSSP 71. Although it would be possible to implement this link using an external UART, the advantage of using an embedded UART is that the connection to the other CSSP is reliable and therefore likely to be functional. Where the embedded UART link does not use the I2C Multiplexer for communications to the other CSSP, a common mode of failure for both the SSP-SSP I2C links can be avoided, it being assumed that the processor 301 is likely to be functional even if the embedded UART channel is non-functional.

For IO to the midplane 171 shown in FIGS. 3A-C and 4A-C, the midplane connector 141 can include eighteen 1 Gb Ethernet connections 265-267 from the Ethernet Switch Asics 244, 245, the serial connections 310, 321 and 322 and the power connections 278, 279.

Each CSSP 71 can access the I2C devices (FRU-ID EEPROM, I2C RCR, and environmental monitor) of another CSSP received in the same shelf via the I2C bus connections through the midplane 171.

For external IO, rear panel Gb Ethernet connections can be provided from the two Ethernet Switch Asics 244,245 to 2×4 stacked RJ45 connectors 139 (to give 8 uplinks). Each port can be an independent 10/100/1000 BASE-T (auto negotiating) port. The rear panel HiGig™ ports can be provided from 10GCX4 connectors.

In an alternative arrangement, the HiGig™ ports can be provided on a removable transition board received through the rear panel of the CSSP 71. The transition board connects to the 10G to HiGig™ converters 255 and provides the rear I/O panel connectors. A number of different transition boards are receivable by the CSSP 71. Each different transition board provides external HiGig™ connectors in a different connector format. The transition board also includes any necessary interface hardware for converting the HiGig™ signals for transmission over the chosen medium. For example, the electrical signals from the 10G to HiGig™ converters are converted into optical signals in a transition board having external optical fibre connections. Other connectors which can be provided by a transition board are connectors for copper interconnects, including 10GCX4 connectors.

In the present example, although a single processor 240 provides the functionality of the switch and service processor, the functions of those two elements are still separate. This arrangement is shown in a simplified schematic form in FIG. 9. To external entities, there still appears to be separate switch and service processor entities within the CSSP 71. Thus the CSSP 71 may be considered to comprise a logical switch element 730 and a logical service processor element 740.

Figure 9:
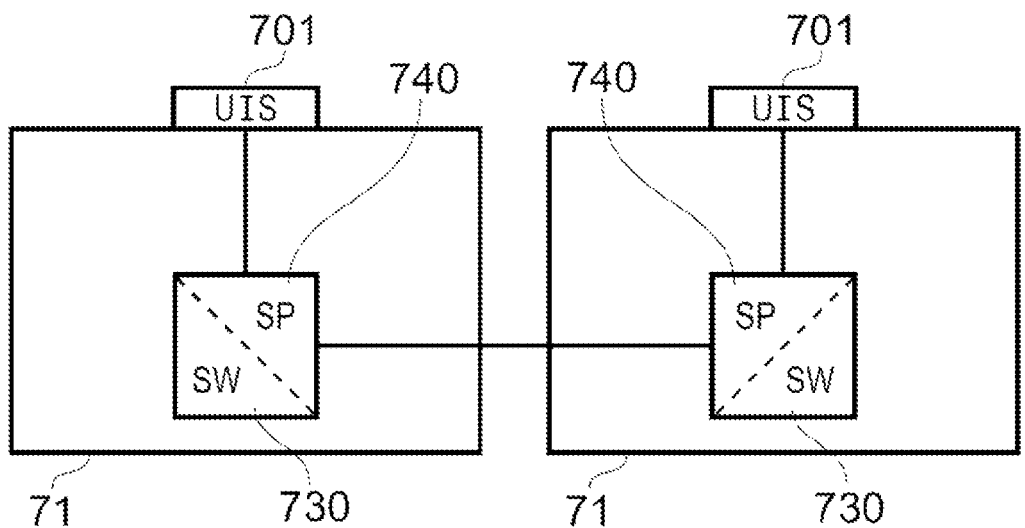
FIG. 9 is a schematic representation of the division of tasks with the system of FIG. 8.

With reference to FIG. 9, there will now be described the interrelationship between the logical switch and service processor elements of the CSSP 71 and the way in which those elements interface with an external management system, for example the SMS, management network and console described with reference to FIG. 10 below.

With reference to FIG. 9, each CSSP 71 is logically although not physically divided into separate switch 730 and service processor 740. Connections between the switch and service processor elements are made in software run on the processor 240. An Ethernet connection 267 allows the CSSP to communicate with another CSSP received in a given shelf. Serial inter-CSSP connections are also provided in the form of I2C connections 321 and the backup UART connection 320. Connections for an external management interface are provided by the external 1 Gb Ethernet connectors 139. As noted above, these connections are soft configurable to provide data or management interface connections. It is via these external Ethernet connections 139 that an external management/service entity can access the User Interface 701 for management and service of the CSSP.

In the present example, the service processor elements 740 in multiple CSSPs 71 in a single shelf 41 interact in a master/slave relationship. Thus one service processor element 740 (the master) controls all service functionality for the entire shelf and the other (the slave) mirrors the behaviour of the master such that if the master fails for any reason (e.g. failure of the service processor element itself or failure of a communications path to that service processor element) the slave can take over as master with minimal performance impact on the computer system. The switch elements 730 of the present example operate as equal peers.

In the present example, the user interface 701 is set up to allow a single point of access to all of the management facilities within a given shelf. As such the external management access passes through the master service processor element 740. In order to ensure conformity between the master and slave service processor elements, an automated synchronisation of parameters between the two service processor elements 740 can be used. The same automated synchronisation process can also be used to synchronise the operational parameters of the switch elements 730. Thus configuration information passed to a shelf via the master service processor element 740 may be used to automatically configure all of the switches in the shelf identically. Examples of the configuration information which may be used to configure the switch elements 730 include permissions for particular processing cartridges and broadcast groups/families.

This system thereby provides a simple external management interface, where only a single point of access to a single user interface is required under normal operating conditions, but where in cases of component failure full multi-point access is available for ensuring configuration of non-failed components can be carried out.

In one example, the switch elements can be managed such that although the switches are peers, one is more in charge than the other(s). This in charge switch can then be the originator of the configuration information for the automatic synchronisation of switch parameters. Once the in charge switch has been configured by an external management entity, its parameters can be automatically synchronised to the other switches by the service processor. This arrangement is not limited to an initial configuration, changes to the switch parameters can also be updated from the external management entity to the in charge switch and the updated parameters then automatically passed to the other switches to ensure synchronisation of configuration. Examples of events which could require changes to switch parameters include removal/failure/shutdown of a processing cartridge, insertion/startup/recovery of a processing cartridge, a change in function of a processing cartridge or a change in an external data or processing entity.

This one switch element in charge system can be applied across multiple shelves. For example a group of shelves may be deployed together as a so-called "server farm" or "web farm" and a single external management entity responsible for the management of the entire server farm can update the configuration parameters of a single in charge switch in one of the shelves within the server farm and those updated parameters are then automatically passed to all of the other switches within the server farm to ensure synchronised configuration.

In order to provide for full and accurate management of the CSSP 71 and by the service processor element 740 therein, it is necessary that the switch element 730 and service processor element 740 are assigned different IP addresses. Thus the switch and service processor elements appear to be separate entities to external entities which communicate with the CSSP 71. As in the previous example, each FRU (CSSP 71, PSU or processing cartridge 43) is configured to obtain a dynamic IP address upon installation into a shelf (or upon reboot/startup etc) using DHCP (Dynamic Host Configuration Protocol).

In the present example, the CSSP 71 upon startup/reboot obtains the FRUID data from the midplane 171. This FRUID is unique to the shelf and is usually stored in an EEPROM co-located with one of the LED indicator boards 183 or 184, which EEPROM is directly addressable by the service processor element 740 via the midplane 171. Each of the switch and service processor elements then uses an identifier including both the shelf-specific ID, a FRU-specific ID and a switch or service processor identifier for performing DHCP configuration. Thus the switch element 730 and the service processor element 740 each perform DHCP configuration such that each obtains a different IP address.

In the present example, typically a single external user interface is provided for management of the shelf via each CSSP 71. This user interface is the interface to the service processor element 740. All commands relating to the switch element 730 are passed directed via the service processor element 740. From an external management point of view this method provides a simple and intuitive system as all management for a given shelf is performed via a shelf-level management entity (the service processor element 740).

This arrangement also allows the management interface of the switch element 730 to be simplified. Taking the example of a command line interface (CLI), the service processor element CLI is operable to perform authentication and cryptographic operations (e.g., encryption/decryption operations) with an external management entity. However, as all management of the switch element 730 is performed via the service processor element 740, the switch CLI has no need for any of that functionality. Similarly, in the case of a GUI, the switch element GUI can work on information only (e.g. http content) and all authentication and encryption/decryption are provided by the service processor element 740.

Another management issue which may affect the computer system of the present example is that of multiple error reporting. That is, a single fault such as failure of the processing cartridge 43 may cause a number of different error reports to be generated, e.g. a SNMP (Simple Network Management Protocol) error from the switch and an email error from the service processor. This may be avoided by providing a fault management unit within the service processor element 740. The fault management unit receives all error messages generated within the CSSP 71 and performs rationalisation processing before passing error messages on to an external management/service entity.

Thus, in practice, once a terminal fault error message is generated and passed on with respect to any given FRU, all further messages relating to that FRU can be ignored and are therefore not passed on to the external management/service entity. For example, if a processing cartridge 43 unexpectedly powers down, the service processor element 740 will notice this and generate a fault message. In addition, the switch element 730 will notice a stop in data flow from that processing cartridge 43 and also generate a fault message reporting that fact. The fault management unit receives the report from the service processor and notifies the external service/management entity that the particular processing cartridge 43 has unexpectedly powered down. The fault management unit also receives the report from the switch element 730 and notices that, as the processing cartridge 43 has powered down, it is no surprise that there is no data flow from it. The fault management unit therefore does not pass on the error message relating to data flow.

This system also allows more intuitive fault fixing. For example if a processing cartridge 43 hangs (i.e. experiences a software error which causes operations to halt but does not shut down the processing cartridge 43), the hang may occur such that erroneous data is repeatedly output via the network port to the switch element 73. The switch element 73 will notice this happening and will shut down that network port so as not to be affected by the erroneous data and will report the error to the fault management unit. The fault management unit will also be notified by the service processor element 740 that an error has occurred with that processing cartridge 43. The fault management unit will record the error messages and pass on details of the failure to the external management/ service entity. These details may then be analysed to determine whether any reversement actions are required by the originator of the error message when a fault repair is attempted. Subsequently, an attempt is made to restart the processing cartridge 43. An instruction is received from the external management/service entity to restart the processing cartridge 43. The fault management unit is consulted and as a result it is discovered that the switch element 730 has shut down its network port relating to that processing cartridge 43. Thus the service processor element 740 can increase the likelihood of the restart working by instructing the switch element 730 to re-open the relevant network port so that if the reboot of the processing cartridge 43 works, that processing cartridge 43 will be able to communicate via the switch element. In the absence of such a system, it is possible that the reboot would be judged a failure regardless of actual success or failure as the data communication channel to and from the processing cartridge would remain closed.

Figure 10:
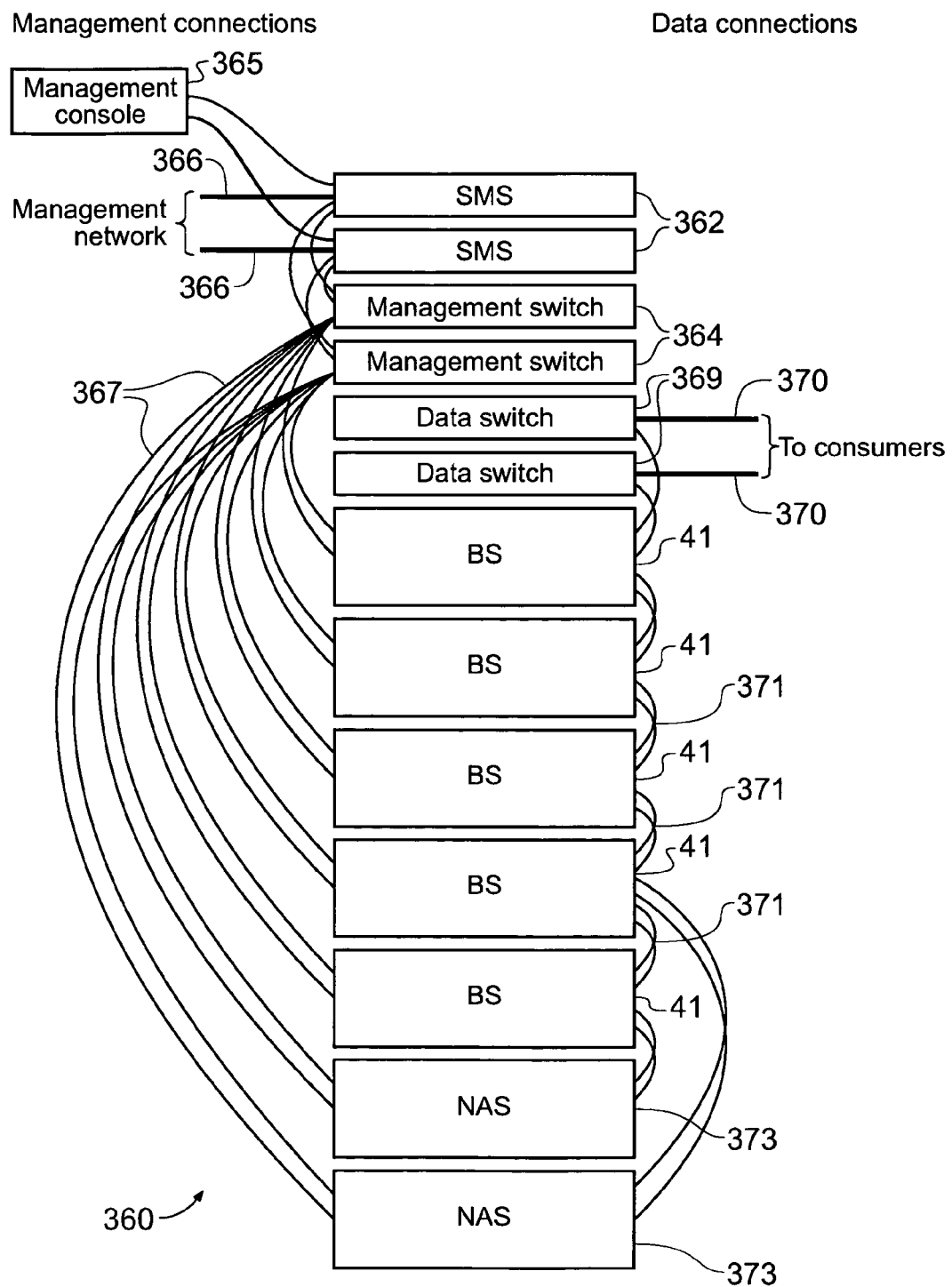
FIG. 10 is a schematic representation of a rack mounted system comprising a plurality of shelves.

FIG. 10 illustrates how a plurality of shelves can be configured within one (or more) racks to provide even higher processing power. Such a constellation of shelves to provide a large grouping of servers is sometimes termed a "web farm" or "server farm" 360. As shown in FIG. 10, the server farm comprises a plurality of shelves 41 that each carry a plurality of blades 43. Also provided are a plurality of Network Attached Storage devices (NAS) 373 for providing storage for critical data, e.g. email data storage, for the server farm. The NASs 373 are not required if there is no critical data to be stored, e.g. if the server farm is operating solely to provide web caching services.

Management control of the web farm 360 can be provided through a pair of System Management Servers (SMSs) 362. Each SMS 362 can be connected to a management network via a link 366 and to a management console 365. The SMSs 362 can communicate with the individual shelves 41 via a pair of management switches 364. Each shelf 41 and NAS 373 can be connected to each management switch 364 via a connection 367. Thus dual redundant management connections can be provided to each shelf 41 and NAS 373.

Flow of data to and from the web farm 360 can be provided through a pair of data switches 369. Each data switch 369 can be connected to a consumer network via a link 370. It is to be understood that the consumer network can be a larger data network to which the web farm 360 is connected. This network can be an office or corporation intranet, a local area network (LAN), a wide area network (WAN), the Internet or any other network. Connections between the data switches and the shelves 41 can be facilitated by connections 371. It is to be noted that as each shelf has its own switching capability, there is no need for each shelf 41 to be directly connected to the data switches 369. Connections can also be provided to connect the NAS units 373 to the shelves 41. The topology used for interconnection of the data switches 369, shelves 41 and NASs 373 can be any topology providing at least one connection of any length between every possible pair of units. Complex topologies arranged to minimise the maximum connection length between any two given units in the web farm can be used.

The server farm 360 comprising a plurality of shelves 41 with or without a plurality of NASs 373 can suitably be used as any or all of the entry edge server group 9, web edge server group 15 and application servers 19 described above with reference to FIG. 1.

As an alternative to providing critical data storage within a NAS 373, such storage can be provided within one or more NAS cartridges fitted into one or more of the shelves 41 in place of processing cartridges 43. Another alternative is to provide a server shelf with local storage (such as a RAID array (Redundant Array of Inexpensive Disks)) in place of the NAS 373.

Thus there has now been described an example of a fully configurable computing system based on a plurality of self contained field replaceable units (FRUs) and scalable from a single processing cartridge with power supply and switching capability to a multiply redundant multiprocessor server system with full system management capability extending over a number of co-operably connected server shelves. The has in particular been described a number of examples of the features of a combined switch and service processor module (FRU) for such a computer system and how those features may be advantageously utilised in management of the computer system. It will of course be readily apparent to the skilled reader that many of the specific features specified in the above description are in no way limiting and a variety of alternatives may be produced using only ordinary skill and common general knowledge. Non-limiting examples of example modifications which may be made to the above described system are discussed hereafter.

Although it has been described above that functionality of a switch and of a shelf service processor should be provided within a single combined switch and service processor unit, this is not essential and separate switch and shelf service processor field replaceable units may be used provided that they are operable to communicate as described as a single logical entity.

The invention claimed is:

1. An apparatus for a modular computer system, comprising:
a combined switch and service processor module configured to couple to an information processing module, wherein the combined switch and service processor module includes:
a switch portion;
a service processor portion;
a data interface configured to communicate with an external management entity via a network; and
a fault management unit configured to receive fault messages generated by the switch portion and by the service processor portion, including respective fault messages generated by the switch portion and the service processor portion that relate to a same fault of the information processing module, and wherein the fault management unit is further configured to perform processing on a received fault message to determine whether to forward the received message to the external management entity via the data interface, wherein the fault management unit is configured to not forward fault messages that relate to the same fault for which the fault management unit has already forwarded a fault message to the external management entity;
wherein the apparatus is further configured to detect that the information processing module is outputting erroneous data relating to the same fault, and, in response thereto, to disable further communication of erroneous data by the information processing module.

2. The apparatus of claim 1, wherein the fault management unit is implemented within the service processor portion.

3. The apparatus of claim 1, wherein the fault management unit is configured to store details of the fault messages irrespective of whether the fault messages are forwarded to the external management entity.

4. The apparatus of claim 3, wherein the stored details of the fault messages includes data describing an action taken by the originator of a given fault message in response to detection of the fault.

5. The apparatus of claim 3, wherein the stored details of the fault messages are analyzed to determine whether any reversement actions are required by the originator of a given fault message when a fault repair is attempted.

6. The apparatus of claim 1, wherein the switch portion and service processor portion are implemented by separate hardware within the combined switch and service processor module.

7. The apparatus of claim 1, wherein the switch portion and service processor portion are implemented by common hardware within the combined switch and service processor module.

8. The apparatus of claim 1, wherein the service processor portion is configured to operate in a master/slave relationship with a service processor portion of another combined switch and service processor module of the modular computer system; and
wherein the service processor portion is further configured to automatically synchronize management information with the service processor portion of the other combined switch and service processor via the data interface in accordance with the master/slave relationship.

9. The apparatus of claim 1, wherein the switch and service processor portions are each configured to communicate with the external management entity to obtain a unique address within a computing environment into which the modular computer system is connected.

10. The apparatus of claim 1, wherein the service processor portion has a user interface configured to receive and forward communications between the external management entity and the switch portion.

11. The apparatus of claim 1, wherein the switch and service processor portions are each configured to create a unique identifier using data unique to the respective portions; and
wherein the service processor portion is configured to supply the service processor portion's unique identifier to the switch.

12. A computer system comprising:
an information processing module;
a combined switch and service processor module, including:
a switch portion;
a service processor portion;
a data interface configured to communicate with an external management entity via a network; and
a fault management unit configured to receive fault messages generated by the switch portion and by the service processor portion, including respective fault messages generated by the switch portion and the service processor portion that relate to a same fault of the information processing module, and wherein the fault management unit is further configured to perform processing on a received fault message to determine whether to forward the received message to the external management entity via the data interface, wherein the fault management unit is configured to not forward fault messages that relate to the same fault for which the fault management unit has already forwarded a fault message to the external management entity;
wherein the computer system is further configured to detect that the information processing module is outputting erroneous data relating to the same fault, and, in response thereto, to disable further communication of erroneous data by the information processing module.

13. A method of operating a combined switch and service processor module for a modular computer system, the combined switch and service processor module having:
a switch portion;
a service processor portion;
a data interface configured to communicate with an external management entity via a network; and
a fault management unit; the method comprising:
the fault management unit receiving fault messages generated by the switch portion and by the service processor portion including a first fault message generated by the switch portion and a second fault message generated by the service processor portion, wherein the first and second fault messages relate to a same fault of an information processing module of the modular computer system;
the fault management unit performing processing on a received fault message to determine whether to forward the received message to the external management entity via the data interface;
the fault management unit not forwarding fault messages that relate to the same fault for which the fault management unit has already forwarded a fault message to the external management entity;
the modular computer system detecting that the information processing module is outputting erroneous data relating to the same fault, and, in response thereto, disabling further communication of erroneous data by the information processing module.

14. The computer system of claim 12, wherein the fault management unit is implemented within the service processor portion.

15. The computer system of claim 12, wherein the fault management unit is further configured to store details of the fault messages irrespective of whether the fault messages are forwarded to the external management entity.

16. The computer system of claim 15, wherein the stored details of the fault messages include data describing an action taken by the originator of a given fault message in response to detection of the fault.

17. The computer system of claim 15, wherein the fault management unit is further configured to analyze the stored details of the fault messages to determine whether any reversement actions are required by the originator of a given fault message when a fault repair is attempted.

18. The computer system of claim 12, wherein the service processor portion is configured to operate in a master/slave relationship with a service processor portion of another combined switch and service processor module of the computer system; and
wherein the service processor portion is further configured to automatically synchronize management information with the service processor portion of the other combined switch and service processor via the data interface in accordance with the master/slave relationship.

19. The method of claim 13, wherein the fault management unit is implemented within the service processor portion.

20. The method of claim 13, further comprising the fault management unit storing details of the fault messages irrespective of whether the fault messages are forwarded to the external management entity.

21. The method of claim 20, wherein the stored details of the fault messages includes data describing an action taken by the originator of a given fault message in response to detection of the fault.

22. The method of claim 20, further comprising the fault management unit analyzing the stored details of the fault messages to determine whether any reversement actions are required by the originator of a given fault message when a fault repair is attempted.

23. The method of claim 13, further comprising operating the service processor portion in a master/slave relationship with a service processor portion of another combined switch and service processor module of the modular computer system; and the service processor portion automatically synchronizing management information with the service processor portion of the other combined switch and service processor via the data interface in accordance with the master/slave relationship.

24. The apparatus module of claim 1, wherein the switch portion is configured to:

disable further communication of the erroneous data by the information processing module, by disabling a network port of the information processing module.

25. The computer system of claim 12, wherein the switch portion is configured to:

disable further communication of the erroneous data by the information processing module, by disabling a network port of the information processing module.

26. The method of claim 13, further comprising:

the switch portion disabling further communication of the erroneous data by the information processing module, by disabling a network port of the information processing module.

27. The apparatus of claim 1, wherein the fault management unit is configured to:

receive a first fault message generated by the switch portion that relates to a particular fault;

forward the first fault message to the external management entity;

receive a second fault message generated by the service portion, wherein the second fault message relates to the particular fault, and wherein the second fault message is received by the fault management unit after receiving the first fault message; and not forward the second fault message to the external management entity in response to determining that the second fault message is related to the particular fault and that the first fault message has already been forwarded to the external management entity.

* * * * *